United States Patent
Harp

(10) Patent No.: US 9,480,953 B2
(45) Date of Patent: Nov. 1, 2016

(54) COMPOSITE FILTER MEDIA FOR FUEL STREAMS

(71) Applicant: W. L. Gore & Associates, Inc., Newark, DE (US)

(72) Inventor: Gary P. Harp, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 255 days.

(21) Appl. No.: 14/049,544

(22) Filed: Oct. 9, 2013

(65) Prior Publication Data

US 2014/0102974 A1 Apr. 17, 2014

Related U.S. Application Data

(60) Provisional application No. 61/714,921, filed on Oct. 17, 2012.

(51) Int. Cl.

| | | |
|---|---|---|
| *B01D 29/00* | (2006.01) | |
| *B01D 39/00* | (2006.01) | |
| *B01D 63/00* | (2006.01) | |
| *B01D 71/36* | (2006.01) | |
| *B01D 69/10* | (2006.01) | |
| *F02M 37/22* | (2006.01) | |
| *B01D 69/12* | (2006.01) | |

(52) U.S. Cl.
CPC ............... *B01D 71/36* (2013.01); *B01D 69/10* (2013.01); *B01D 69/12* (2013.01); *F02M 37/221* (2013.01); *B01D 2325/20* (2013.01); *B01D 2325/24* (2013.01); *B01D 2325/38* (2013.01)

(58) Field of Classification Search
CPC ............... B01D 2239/065; B01D 2239/0654; B01D 2325/021; B01D 67/0027; B01D 69/02; B01D 69/06; B01D 69/12; B01D 71/36

See application file for complete search history.

(56) References Cited

U.S. PATENT DOCUMENTS

| | | | |
|---|---|---|---|
| 3,953,566 A * | 4/1976 | Gore ..................... | B01D 71/36 264/127 |
| 4,787,949 A | 11/1988 | Cole et al. | |
| 4,959,141 A | 9/1990 | Anderson | |
| 5,476,589 A | 12/1995 | Bacino et al. | |
| 5,814,405 A * | 9/1998 | Branca ............... | B01D 39/1692 264/127 |
| 6,997,327 B2 | 2/2006 | Sprenger | |
| 7,306,729 B2 | 12/2007 | Bacino et al. | |
| 7,988,860 B2 | 8/2011 | Kalayci et al. | |
| 8,679,218 B2 * | 3/2014 | Wertz .................. | B01D 39/163 442/381 |

(Continued)

FOREIGN PATENT DOCUMENTS

| | | |
|---|---|---|
| EP | 1882514 | 1/2008 |
| WO | WO 01/34273 | 5/2001 |

OTHER PUBLICATIONS

Wikol et al., Expanded Polytetrafluoroethylene Membranes (Jul. 20, 2008, accessed on Nov. 17, 2014).

(Continued)

*Primary Examiner* — Ana Fortuna
(74) *Attorney, Agent, or Firm* — Kilpatrick Townsend & Stockton, LLP

(57) ABSTRACT

The present invention provides a composite filter media for use in a fuel stream wherein the composite media provides significantly improved resistance to water penetration as indicated by the FWWPP normalized for fuel IFT and a reduced resistance to flow of the fuel stream as indicated by the Ratio of Resistances.

19 Claims, 15 Drawing Sheets

Inventive Composite

(56) References Cited

U.S. PATENT DOCUMENTS

| | | | |
|---|---|---|---|
| 8,721,756 B2* | 5/2014 | Handley | B01D 46/0068 55/385.1 |
| 2003/0189002 A1 | 10/2003 | Proulx et al. | |
| 2007/0065644 A1* | 3/2007 | Blomeling | B29C 43/146 428/158 |
| 2008/0105628 A1* | 5/2008 | Gurol | B82Y 30/00 210/797 |
| 2008/0105629 A1 | 5/2008 | Yang et al. | |
| 2010/0300295 A1 | 12/2010 | Yamakawa | |
| 2011/0259796 A1 | 10/2011 | Chen et al. | |
| 2014/0102974 A1* | 4/2014 | Harp | B01D 71/36 210/488 |

OTHER PUBLICATIONS

International Search Report PCT/US2013/064221 dated 1/17/2104.

* cited by examiner

COMPOSITE FILTER MEDIA FOR FUEL STREAMS

FIELD OF THE INVENTION

The present invention relates to composite filters exhibiting high water penetration resistance in fuel streams. More particularly, the invention relates to multilayer composites exhibiting low resistance to fuel flow in combination with high resistance to water penetration. The inventive composites are especially useful in fuel streams including, but not limited to those comprising hydrocarbons such as petrol, gasoline, and/or middle distillate fuels such as diesel fuel, jet fuel, kerosene and similar fuels, including Fischer Tropsch fuels, biodiesel, and blends thereof.

BACKGROUND OF THE INVENTION

Composite filter media find wide use in the purification of fuel streams. In these fuel stream applications the filters allow significant fluid flow through their structures while offering benefits of solid particulate removal. The composite media employed often comprise several discrete layers and these layers can be bonded together in a laminate at discrete points of contact or held in place by cooperative seals at their edges. One drawback common to current media is a high resistance to flow of fuel fluids through their structures resulting in high operating differential pressures. Furthermore these same composite structures exhibit a low resistance to the penetration of water when immersed in a fuel stream. Here the water in the fuel stream may take the form of particles, chunks, slugs, streams, or film forming layers that are a separate discrete phase from the fuel.

Composite filter media known in the art include a wide variety of porous and composite materials. The porous composite media most commonly employed in practice are comprised of fibrous polymer non-wovens, cellulose or paper non-wovens, including those containing microfiberglass, and textiles. Many of the aforementioned media also include hydrophobic coatings. Examples also exist of fibrous and non-fibrous microfilter membranes including fully and partially fluorinated polymers and expanded polytetrafluoroethylene (ePTFE), for example those described in US 2008/0105629 A1.

In general, these composite filter media of the prior art provide only low resistance to water penetration in fuel streams. In a variety of applications it is desirable to have media that exhibits low resistance to fuel flow with a high resistance to water penetration. This is particularly desirable in application of these composites in fuel filters used for middle distillate fuels in the aviation and automotive industries. For example, in a variety of fuel purification endeavors it is desirable to have a media that exhibits a high resistance to water penetration so as to allow consistent water removal over a range of flow rates and differential pressures experienced by a fuel filter.

The applicants have discovered that the resistance of a media to water penetration when wet with fuel can be quantified in terms of the pressure required to drive water to penetrate through the media in a laboratory test of Fuel Wet Water Penetration Pressure, referred to hence forth as the FWWPP test. Furthermore, it has been discovered that the FWWPP value is influenced by both the quality of the fuel in terms of its interfacial tension against water (IFT) and the structure of the composite filter media. A useful metric for water penetration resistance is thus given by the ratio of FWWPP/IFT.

While a resistance to water penetration is desired, what is truly missing from current known composite media is a combination of high resistance to water penetration with low resistance to flow in a composite media. The applicants have also found that the airflow of the base media is inversely related to the resistance to fuel flow of many composite structures. Therefore a useful figure of merit can be defined as the ratio of water penetration resistance FWWPP/IFT to resistance to flow as represented here by the airflow resistance (1/ATEQ Airflow Value). Henceforth, herein this ratio of (FWWPP/IFT)/(1/ATEQ Airflow Value) is referred to as the Ratio of Resistances for Water Penetration to Flow. In addition to high water penetration resistance, and a high Ratio of Resistances, in some applications, it is desirable for a fuel filter media to prevent penetration of a bulk water slug through the filter media to pressures exceeding the maximum driving pressure of the supply pump, particularly when the water takes the form of a water slug which excludes fuel from the upstream plumbing and filter media surfaces. This is particularly important for filters immersed in fuel streams that end in the fuel tanks of jet airplanes and trucks. The passage of water slugs through said filter media can result in catastrophic icing of aircraft fuel lines or major damage to the fuel injectors of modern diesel engines.

The prior art includes known examples of technologies capable of limiting or reducing water passage in the presence of water slugs. These technologies typically comprise a super absorbent polymer (SAP) and combinations of fibrous nonwovens and woven materials. See for example U.S. Pat. No. 4,959,141, U.S. Pat. No. 6,997,327 and U.S. Pat. No. 7,998,860 and references therein. On contact with water the SAP polymer takes up the water swelling shut the filter media and preventing further fuel or water flow. This media can provide significant resistance to water penetration (FWWPP/IFT) e.g. >5000 PSI/(lb/ft), However this technology typically reduces or shuts off fuel flow, further increasing the resistance of said filter media to flow and so often exhibits a poor resistance ratio on exposure to even small quantities of water.

In addition, the resistance to water penetration from these materials is not typically robust because swelling of the SAP polymer is a kinetic phenomenon. Therefore, water rejection depends closely on the flow rate, operating conditions, and quantity of water introduced. Furthermore, the SAP technology lacks robustness to repeated pressure spikes and certain fuel system icing inhibitors such diethylene glycol monomethyl ether and other polar compounds such as biofuels which can result in extrusion, migration, or leaching of super absorbent polymer into the fuel stream with deleterious consequences. For example jet engine flame out and surface residue have been linked to the migration of this super absorbent polymer.

Another technology known in the art is the use of a fibrous non-woven comprised of cellulose, fiber glass, or polymeric fibers or a composite thereof. Such non-wovens exhibit varying degrees of resistance to flow and typically provide negligible resistance, <70 PSI/(lb/ft), to water penetration when wet with fuel. Furthermore, such materials are often coated with hydrophobic or water repellant polymers to increase their respective resistance to water penetration. Despite application of these treatments these materials typically exhibit low resistance, <1500 PSI/(lb/ft) (FWWPP/IFT), to water penetration when wet with fuel and have a low Ratio of Resistances<10400 (Water Penetration/Flow) [((PSI/(lb/ft))/(hr/liter)].

Examples also exist of fibrous microfilter membranes of expanded polytetrafluoroethylene (ePTFE), for example those described in US2008/0105629 A1. These prior art materials can provide some resistance to water penetration in fuel streams ranging from 30 to 4000 PSI/(lb/ft). However these materials presently exhibit significant resistance to flow and thus have relatively low Ratios of Resistance ratios under 10400 (Water Penetration/Flow) [((PSI/(lb/ft))/(hr/liter)] when they exhibit significant water penetration resistance.

Thus, there is a need for a filter media that exhibits a high resistance to water penetration >10500 PSI/(lb/ft) with a high Resistance Ratio in order to allow for effective water separation under a variety of operating conditions covering a range of flows and differential pressures. In addition there is a need for a filter media that prevents penetration of water slugs to the down stream when wet with fuel and faced with a high impinging pressure. Furthermore, there is a long-felt need for a filter media capable of preventing the penetration of water slugs at high impingement pressures without the possibility of deleterious leaching, extrusion, or migration of super absorbent polymer.

SUMMARY OF THE INVENTION

The present invention provides a composite filter media for use in a fuel stream wherein the composite media provides significantly improved resistance to water penetration as indicated by the FWWPP normalized for fuel IFT and a reduced resistance to flow of the fuel stream as indicated by the Ratio of Resistances. In one embodiment, the composite filter media is comprised of an ePTFE membrane and support structure, wherein the ePTFE membrane is positioned upstream of the support structure. Preferably, the inventive composites are significantly differentiated from those described heretofore in the art in that they satisfy the relations: Ratio of Resistances>10500 [((PSI/(lb/ft))/(hr/liter)], and fuel wet water penetration resistance FWWPP/IFT>2600 PSI/(lb/ft).

As used herein a "support structure" means a layer of finite thickness with pores, channels, or openings traversing its thickness such that the surface openings are larger than the smallest pore size of the membrane. In a further aspect of the invention, it has been discovered that obtaining the improved resistance to water penetration requires the support structure to posses an average pore/opening size such that the relation of the membrane matrix tensile strength (MTS)/support structure opening diameter is >$10^5$ PSI/Inch. More preferred are those composites that fulfill the relation MTS/opening diameter is >$10^6$ PSI/Inch and most preferred are composites that fulfill the relation MTS/opening diameter is >$10^7$ PSI/Inch. Also preferably, the support structures of the novel composites have a Mullen burst pressure>FWWPP. Furthermore, when such criteria are met it has been discovered that the composite filter media exhibits novel high resistance to water slug penetration at high pressures far in excess of any fuel wet water penetration resistance realized in the prior art.

DETAILED DESCRIPTION OF THE INVENTION

The invention includes the composite filter media, the composition of the media, and the method(s) of using the composite filter media in fuel streams including articles comprising the media and applications of commerce.

Figure 1:
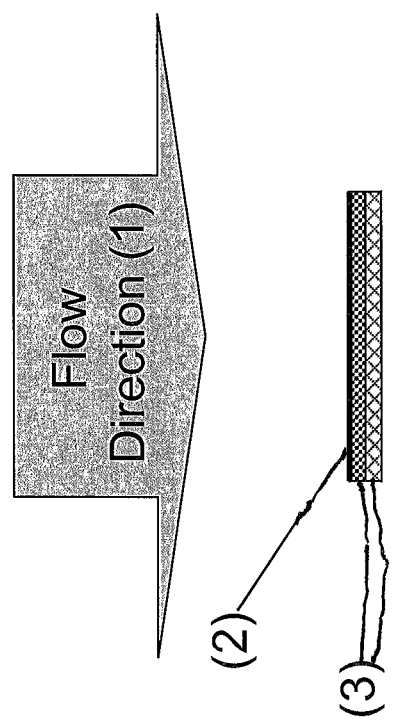
FIG. 1 is a side cross-sectional view of an exemplary embodiment of the present invention.

FIG. 1 shows an exemplary embodiment of the inventive composite, the arrow (1) depicts the flow direction of a fuel stream, in which an ePTFE membrane (2) is upstream of and adjacent to a support structure (3) which may be comprised of nonwovens. The invention relates to a composite filter media comprised by an ePTFE membrane and support structure, wherein the ePTFE membrane is positioned upstream of the support structure and the inventive membranes satisfy the relations: Ratio of Resistances>10500 [((PSI/(lb/ft))/(hr/liter)], and fuel wet water penetration resistance (FWWPP) is >2500 PSI/(lb/ft).

As used herein a "support structure" means a layer of finite thickness with pores, channels, or openings traversing its thickness such that it possesses an average pore/opening size such that the relation of the membrane MTS/opening diameter is >$10^5$ PSI/Inch and the support has a Mullen burst pressure>FWWPP ePTFE membranes suitable for this invention include those produced by processes described in U.S. Pat. No. 7,306,729, and U.S. Pat. No. 4,902,423, and combinations of ePTFE membranes with those described in references described in the above art. Suitable support structures include single and multilayer constructs wherein the layers may comprise nonwoven materials, porous or microporous membranes, woven materials, and screens produced by machining, perforation or their processes. The membrane or support structures can take the embodiment of flat sheets or other three dimensional shapes so long as the membrane is in contact with and fixed to the support structure. Fixation or bonding to the support structure may be accomplished mechanically with a gasket by compression under load or by adhesive at the edges, across the surface uniformly, or discretely as in a laminate. Herein, nonwoven materials include a body or mat comprised of a plurality of fibers, fine fibers, microfibers, nanofibers, or a mixture thereof wherein the volume of the body is comprised of regions of both solid and gas.

Materials suitable to serve as a "support structure" include woven textiles, perforated screens of metal or plastic, and porous sintered plastics, metals, or ceramics. Furthermore, support materials which posses an average pore/opening size such that the relation of the membrane MTS/opening diameter is >$10^5$ PSI/Inch have been found to provide unexpected high water penetration resistance and are preferred.

Materials suitable to serve as a "porous nonwoven filter media" can be any porous non-woven material of organic or inorganic composition. If the non-woven is fibrous, microfibrous, or nanofibrous it can contain other materials besides the fibers including fillers, binders, coatings, and/or lubricious coatings including, but not limited to those comprised of silicone or fluoropolymer dispersions. Suitable nonwovens include synthetic polymer, natural polymer, and inorganic or glass fibers. They can fall into the general classifications of nonwovens including but not limited to meltblown materials, spunbond materials, wet laid materials, electromeltblown materials, electrospun materials, and composites thereof. These nonwovens can be produced and processed by methods including, but not limited to, melt extrusion, melt extrusion with air jets, solvent spinning, towing of fibers and yarns, carding, needle punching, hydroentanglement, fibersplitting, wetlaying, drylaying, paste extrusion, perforation, stretching, and other means known to skilled practitioners in the arts of non-woven production.

In a preferred embodiment, composite filter media is comprised of an ePTFE membrane and support structure, wherein the ePTFE membrane is positioned upstream of the support structure. Herein, the inventive composite satisfies the relations: Ratio of Resistances>10500 [((PSI/(lb/ft))/(hr/liter)], fuel wet water penetration resistance is >2600 PSI/(lb/ft), the support structure is porous, of finite thickness, and fulfills the relations that its Mullen burst pressure>FWWPP and the ratio of the membrane MTS/the support structure surface opening or pore size is >$10^5$ PSI/Inch. As such the inventive composite filter media may exhibit water penetration resistances FWWPP/IFT>2500 PSI/(lb/ft). Furthermore preferred are composite filter media that exhibit FWWPP>8000 PSI/(lb/ft). Also preferred are composite filter media that exhibit FWWPP>10,000 psi/(lb/ft). Said media exhibit high water penetration resistance.

Furthermore when such criteria are met it has been discovered that the composite filter media may exhibit novel high resistance to water penetration when wet with fuel at high pressures far in excess of slug resistance realized in the prior art.

EXAMPLES

Testing Methods
Interfacial Tension Measurement

Interfacial tension of test fuels against water was measured using Kruss K12 hardware bios version 4.04 running the Kruss Laboratory Desktop Software version 2.0.0.2207 using the DuNoy Ring Pull Method. DuNuoy ring immersions were conducted with flamed Kruss standard platinum ring and the software default dip parameters, except the immersion measuring speed was set to 1 mm/minute. RO Deionized water which had 18 MΩ resistivity from a MllliQ system was used for these tests.

Thickness Measurements

Thickness of the samples was taken using a thickness snap gauge Kafer FZ1000/30 or equivalent.

Airflow Measurements

The airflow through the membranes and nonwovens was measured using a gas flow measurement system ATEQ D520 Gas flow leak tester version 1.00 (ATEQ LES CLAYES SOUS BOIS—France). The ATEQ was attached to a sample fixture which pneumatically seals an o-ring to a 1.92 cm diameter circular area of 2.9 cm$^2$ on a support screen. Air flow is then recorded in L/hr at a differential pressure of 0.174 psi (12 millibar). Air flow measured this way can be converted to other common units of measurement using the relation 164.6467/(L/hr ATEQ Value)=Gurley Second Value and Gurley Second Value=3.126/Frazier number.

Bubble Point and Pore Size Measurements

The bubble point and mean flow pore size were measured according to the general teachings of ASTM F31 6-03 and ASTM E1294 using a Capillary Flow Porometer (Model CFP 1500 AEXL from Porous Materials Inc., Ithaca, N.Y.). The sample membrane was placed into the sample chamber and wet with SilWick Silicone Fluid (available from Porous Materials Inc.) having a surface tension of 19.1 dynes/cm. The bottom clamp of the sample chamber had a 2.54 cm diameter, 3.175 mm thick porous metal disc insert supplied with the instrument (Porous Materials Inc., Ithaca, N.Y., ~20 micron MFP based on the instrument) and the top clamp of the sample chamber was supplied by the manufacturer had a ¼ inch diameter hole. Using the Capwin software version 6.74.70 the following parameters were set as specified in the table immediately below. Using the above method a 10 micron pore size track etch membrane (Sterlitech, Kent Wash. PNPCT0113100) 9.36 microns (Sterlitech, Kent Wash. PNPCT10013100) had an instrument reported mean flow pore size of and a 100 nm pore size track etch membrane had an instrument reported mean flow pore size of 0.10 microns.

| Parameter | Set Point |
|---|---|
| maxflow(cc/min) | 200000 |
| bulbflow (cc/min) | 30 |
| F/PT (old bubltime) | 50 |
| minbppres (PSI) | 0 |
| zerotime (sec) | 1 |
| v2incr (cts) | 10 |
| predinc (cts) | 1.25 |
| Pulse delay (sec) | 2 |
| maxpre (PSI) | 500 |
| pulse width (sec) | 0.2 |
| mineqtime (sec) | 30 |
| presslew (cts) | 10 |
| flowslew (cts) | 50 |
| eqiter | 97 |
| aveiter | 20 |
| maxpdif (PSI) | 0.1 |
| maxfdif (cc/m) | 50 |
| sartp (PSI) | 1 |
| sartf (cc/min) | 500 |

Viscosity Measurement

Viscosity was measured using a Brookfield DVII+ viscometer with a UL low volume spindle and tube accessory or other accessory. Viscosities are reported in centipoise (cP) for a temperature of 22.5 degrees Celsius, at 100 RPM, Viscosities were read after five minutes at 100 RPM for samples which had previously been run at the maximum RPM allowed by torque.

Burst Pressure Measurement

The Mullen's burst test (Federal Std. 191A, Method 5512) is performed in the following manner. The test consists of clamping a test specimen in a fixture, applying glycerol under pressure against the inner surface, and visually observing the outward facing surface of the specimen until the specimen ruptures (burst). The pressure at which these events occur is recorded.

Density Measurements and Porosity Calculations

Samples die cut to form rectangular sections 2.54 cm by 15.24 cm were measured to determine their mass (using a Mettler-Toledo analytical balance modelAG204) and their thickness using a Kafer FZ1000/30 thickness snap gauge. Using these data, density was calculated with the following formula:

$$\rho = \frac{m}{w*l*t}$$

in which: ρ=density (g/cc); m=mass (g); w=width (cm); l=length (cm); and t=thickness (cm). The average of the three measurements was used.

Porosity is expressed in percent porosity and was determined by subtracting the quotient of the average density of the article (described earlier herein) and that of the bulk density of PTFE from 1, then multiplying the value by 100%. For purposes of this calculation, the bulk density of PTFE was taken to be 2.2 g/c Tensile Break Load Measurements and Matrix Tensile Strength (MTS) Calculations Tensile break load was measured using an INSTRON 1122 tensile test machine equipped with flat-faced grips and a 0.445 kN load cell. The gauge length was 5.08 cm and the cross-head speed was 50.8 cm/min. The sample dimensions were 2.54 cm by 15.24 cm. For longitudinal MTS measurements, the larger dimension of the sample was oriented in the machine, or "down web," direction. For the transverse MTS measurements, the larger dimension of the sample was oriented perpendicular to the machine direction, also known as the cross web direction. Measurements were conducted at ambient pressure, relative humidity, and room temperature. Generally, this was 1 atmosphere, 25% relative humidity, and 21° C. Each sample was weighed using a Mettler Toledo Scale Model AG204, then the thickness of the samples was taken using the Kafer FZ1000/30 thickness snap gauge. The samples were then tested individually on the tensile tester. Three different sections of each sample were measured. The average of the three maximum load (i.e., the peak force) measurements was used. The longitudinal and transverse MTS were calculated using the following equation: MTS= (maximum load/cross-section area)*(bulk density of PTFE)/density of the porous membrane), wherein the bulk density of PTFE is taken to be 2.2 g/cc.

Porosity was expressed in percent porosity and was determined by subtracting the quotient of the average density of the article (described earlier herein) and that of the bulk density of PTFE from 1, then multiplying that value by 100%. For the purposes of this calculation, the bulk density of PTFE was taken to be 2.2 g/cc.

Water Penetration Challenge Support Structure Test

A lab scale test to challenge discrete disc samples of membranes on supports of varying opening or pore size was developed. For these purposes we have assembled the apparatus depicted in FIG. 2. The apparatus was comprised by a compressed gas supply (4), controlled by a pressure regulator with a pressure gauge for read out (5), followed by a ball valve for instant pressure introduction to initiate a water column (6), a U shaped tube to provide for a fuel column supported by a water column (7), a drain valve (8), a water column (9), on which a fuel column rested (10), a test sample immersed in fuel and supported by a perforated metal screen (11). followed by an air filled outlet line (12), and ending in a bubble indicator beaker filled with fuel (13) Briefly a U-tube was created and filled with water with a sample mounted in a fuel column in one leg. The sample was mounted on a support screen with a specified mesh size of 10, 20, 40, or 100 provided by woven stainless steel (SS) wire mesh encased in an annular 1.5" Viton sanitary gasket (GVC direct, Northport Fla. 4zAPVSXXX-40SS) as shown in FIG. 3. FIG. 3 shows the details of the sample mounting for the inventive composite in this test. Specifically an ePTFE membrane (14), was supported on a woven wire mesh encased in a sanitary gasket or disk of wire mesh on top of the wire mesh encased in the sanitary gasket (15). Where the above stack was sealed by clamping between the flanges of two a transparent polysulfone sanitary sight glasses (16) [GVC direct PN 24PSSG-6]. Smaller SS woven meshes (McMaster-Carr, Aurora, Ill. pn 85385T885 and 85385T882) of mesh size 270, and 400 were also employed. For these the meshes discs were die cut to an OD of 1.75 inches and the edges covered with a 1.5" id THV fluoropolymer film gasket and supported on a 100 mesh GVC direct sanitary screen gasket. A fuel layer was rested on the water, and the fuel layer was raised by water addition to the opposite leg until the test sample was wet/immersed in fuel. A separate regulator was used to generate a gas pressure behind a valve feeding a line to the water filled leg of the U tube without fuel. Pressure was applied to the water column and drove fuel through the membrane and pressurized the water against the membrane surface. Pressure was increased in 5 psi increments waiting 20 seconds after each increment to determine if flow was observed. Flow was determined by observation of a continuous stream of bubbles from the end of the outlet tube immersed in a beaker of fuel. The first pressure at which flow was observed was recorded as the water penetration pressure. The sample was then de-pressurized and fuel/water down stream of the filter was decanted. In all cases it was found that observation of continuous flow was accompanied by observation of water penetrating the membrane sample. The test fuel used was produced from clay treated jet fuel (Jet A, 2 cp, 0.82 g/ml, fuel water IFT=39 mN/m (0.029 lb/ft)). Water for the tests was Deionized water with 18 MO resistance from a MilliQ system.

Fuel Wet Water Penetration Pressure Measurement (FW-WPP Test)

Figure 4:
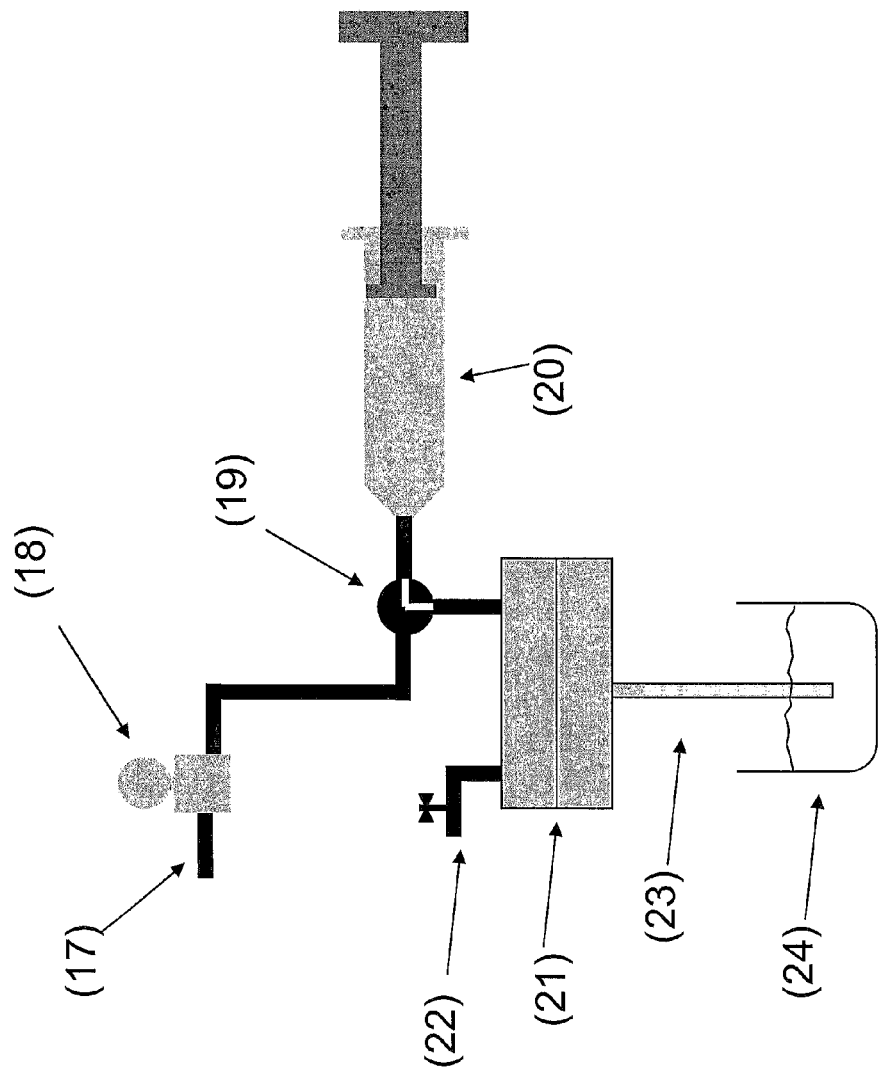
FIG. 4 is a schematic diagram of the FWWPP test apparatus.

The test apparatus of FIG. 4 was assembled. The apparatus was comprised of a compressed gas supply from a grade 5.0 nitrogen cylinder (17), a pressure regulator with digital gauge read out to +/−0.01 PSI (18), to a flow switching valve (19), with a luerlock port for interchangeable 50 ml syringes containing water or fuel (20), to a high pressure stainless steel filter holder (21), with a vent/pressure relief valve (22), a downstream outlet tube of 1 mm inner diameter (23), ending submerged in a beaker of fuel for detecting flow and water penetration (24). Briefly the membrane or non-woven test sample was sealed in a high pressure SS filter holder (Millipore, Bedford Mass. PN XX45 047 00) using a Viton o-ring. Samples were die cut to a 47 mm diameter and were mounted on top of a 47 mm disk of woven nylon with 5 micron openings (Spectrum Labs, Rancho Dominguez Calif. PN S148100) which rested on the 47 mm diameter plates provided as standard with the filter holder. (These included 1 fine perforated screen with 320 micron holes in a square array and one coarse plate with 2 mm holes in a square array included with the filter holder). The sample mounted in the test holder was flushed with 20 ml of test fuel using a syringe by opening the switching valve and the vent valve. For these tests test fuel was either clay treated Jet A IFT=39.76 mN/m [or 0.029 lb/ft] or commercial Shell ultra low sulfur diesel fuel IFT=16.55 mN/m [or 0.012 lb/ft]. Prior to testing the diesel fuel was pressure filtered through a 0.1 micron pore size filter to remove particulates. The fuel syringe was exchanged for a water containing syringe. The vent on the filter housing was then opened and the switching valve was then switched to the water syringe which was manually actuated allowing water to fill the upstream of the housing displacing any fuel (~a total of ~20 ml of water with the connecting plumbing). The vent valve was then closed and the switching valve was switched to the gas pressure line to apply gas pressure. The applied pressure was controlled using a regulator attached to the compressed gas supplied by the nitrogen a gas cylinder. For low water penetration pressure samples a 0-25 psi regulator was used and for high pressure samples 0-500 psi regulator was used. Pressure was read using a digital gauge with 0.01 psi accuracy. Pressure was manually increased in increments of 1 psi for samples tested on the low pressure regulator and in 5 psi increments for samples tested on the high pressure regulator. After each pressure increase pressure was held for 10 seconds. If flow was not observed at a given pressure the pressure was incrementally increased to the next test pressure. If the sample was visually determined to exhibit flow at a rate>1 ml/minute the sample was held for at least another 30 seconds or until water was visible in the down stream of the sample holder. Clear Tygon tubing with a 1 mm bore was used on the down stream of the filter allowing for detection of flow at volume changes of 0.1 ml or less.

Fuel Wet Water Stream Challenge

A necessary qualification for a fuel filter monitor is to stop flow and prevent water penetration when in the course of filtering a fuel stream it is suddenly changed to a pure water stream. Following the teachings of E11583 this qualification is sometimes performed as a water slug test at 10% rated flow. The purpose of this test is again to challenge the fuel filter monitors ability to resist water penetration. For this test the apparatus described in FIG. 5 was assembled. Briefly a progressive cavity pump (25) with Viton seals (Moyno MO3095596, model 33101 with a variable speed controller and drive baldor VS1mx10p5-2) was plumbed in-line up-stream of a Gammon Technologies GTP SK-853 housing (26) [this housing is designed for a 2" od by 6" length fuel filter monitor]. Upstream of the pump was a three-way valve (27) allowing the pumps feed to be switched between a 5 L fuel sump (28) and a 5 L water sump (29). Downstream of the monitor housing was another three-way valve (27) allowing the fuel passing the filter monitor to be diverted from the recirculation loop to a separate collection vessel (30). Pressure sensors (31) [Scilog Scipres series] placed up and downstream of the fuel filter monitor housing and the filter differential pressure was recorded via a Scipress monitor into MS-Excel using a PC running WinWedge software. A valve was attached off of the upstream of the monitor housing (32) allowing the upstream volume of the filter housing to be drained or exchanged. To accomplish a test, fuel was flowed through 6 inch monitor elements at a flow rate of 2 L/min which is ~10% of the full rated flow of monitors of this diameter and length. The test fuel used was produced from clay treated jet fuel (Jet A, 2 cp, 0.82 g/ml, fuel water IFT=39 mN/m). To simulate polar contaminants the fuel was blended with 2 wt % DIEGME (DIEGME—Part #579548, Sigma-Aldrich Co. LLC). The JET A and DIEGME fuel had a fuel water IFT of 35 mN/m. Water for the tests was Deionized water with 18 M☐ resistance from a MilliQ system. Fuel was recirculated through the test filter element for 30 minutes prior to water introduction. Then both the valve upstream of the pump and downstream of the filter were simultaneously switched to feed pure water to the filter and to collect all fluid passing the filter. The pump was stopped when pressure was observed to spike >40-70 psi. The pump was restarted to simulate pulsing and creating a pressure spike. This process was repeated a total of 6 or 7 times to simulate the impact of pressure spikes on water penetration. The test filter housing was inverted to decant downstream fuel and any water which had passed the filter into the collection vessel. The water and fuel were separated using a separatory funnel and quantified gravimetrically using a balance based on density. The three way valves upstream of the pump and down stream of the filter monitor were then returned to their original positions. Water was then drained from the upstream of the test filter housing drain valve with the pump restarted, forcing water to exit the upstream of the filter housing. The drain valve was then closed and subsequent pressure drop and flow was monitored. If the pressure was observed to spike the pump was shut down. If the pressure drop was low the filter was allowed to equilibrate in flow and the water slug test described above was repeated.

Example 1

A monolithic ePTFE membrane was made by processes described in U.S. Pat. No. 7,306,729. The membrane had an average matrix tensile strength (MTS) of 56378 (PSI), an ATEQ airflow of 39.5 L/h, a bubble point of 50.2 psi, a porosity of 87%, mass/area of 1.5 g/m$^2$, a thickness of 0.20 mils, and a mean flow pore size of 0.18 microns. The membrane above, was mounted on a 10 mesh support screen for the water penetration support structure challenge as shown in FIG. 3. The sample was tested per the Water Penetration Challenge Support Structure Test method described above and exhibited a water penetration pressure of 30 psi for Jet fuel (IFT=39.9 mN/m (0.029 lb/ft)). The stainless steel mesh had an opening size of 2000 microns and a manufacturer reported burst strength >400 psi.

Example 2

The membrane of example 1, was mounted on a 20 mesh support screen for the water penetration support structure challenge as shown in FIG. 3. The sample was tested per the Water Penetration Challenge Support Structure Test method described above and exhibited a water penetration pressure of 50 psi for Jet fuel (IFT=39.9 mN/m (0.029 lb/ft)). The stainless steel mesh had a manufacturer reported opening size of 841 microns based on the weave and a burst strength >400 psi.

Example 3

The membrane of example 1, was mounted on a 40 mesh support screen for the water penetration support structure challenge as shown in FIG. 3. The sample was tested per the Water Penetration Challenge Support Structure Test method described above and exhibited a water penetration pressure of 90 psi for Jet fuel (IFT=39.9 mN/m (0.029 lb/ft)). The stainless steel mesh had a manufacturer reported opening size of 400 microns based on the weave and a burst strength >400 psi.

Example 4

The membrane of example 1, was mounted on a 270 mesh support screen for the water penetration support structure challenge as shown in FIG. 3. The sample was tested per the Water Penetration Challenge Support Structure Test method described above and exhibited a water penetration pressure of 100 psi for Jet fuel (IFT=39.9 mN/m (0.029 lb/ft)). The stainless steel mesh had a manufacturer reported opening size of 53 microns based on the weave and a burst strength >200 psi.

Example 5

The membrane of example 1, was mounted on a support screen comprised of a nylon mesh resting on a 400 mesh stainless steel screen for the water penetration support structure challenge as shown in FIG. 3. The sample was tested per the Water Penetration Challenge Support Structure Test method described above and exhibited a water penetration pressure of 105 psi for Jet fuel (IFT=39.9 mN/m (0.029 lb/ft)).

Example 6

A monolithic ePTFE membrane was made by processes described in U.S. Pat. No. 7,306,729. The membrane had an average matrix tensile strength of 63146 (psi), an ATEQ airflow of 20.5 L/h, a bubble point of 84.2 psi, a porosity of 76%, mass/area of 2.6 g/m², a thickness of 0.20 mil, and pore size of 0.15 microns. The membrane above, was mounted on a 10 mesh support screen for the water penetration support structure challenge as shown in FIG. 3. The sample was tested per the Water Penetration Challenge Support Structure Test method described above and exhibited a water penetration pressure of 50 psi for Jet fuel (IFT=39.9 mN/m (0.029 lb/ft)). The stainless steel mesh had an opening size of 2000 microns and a manufacturer reported burst strength >400 psi.

Example 7

Figure 2:
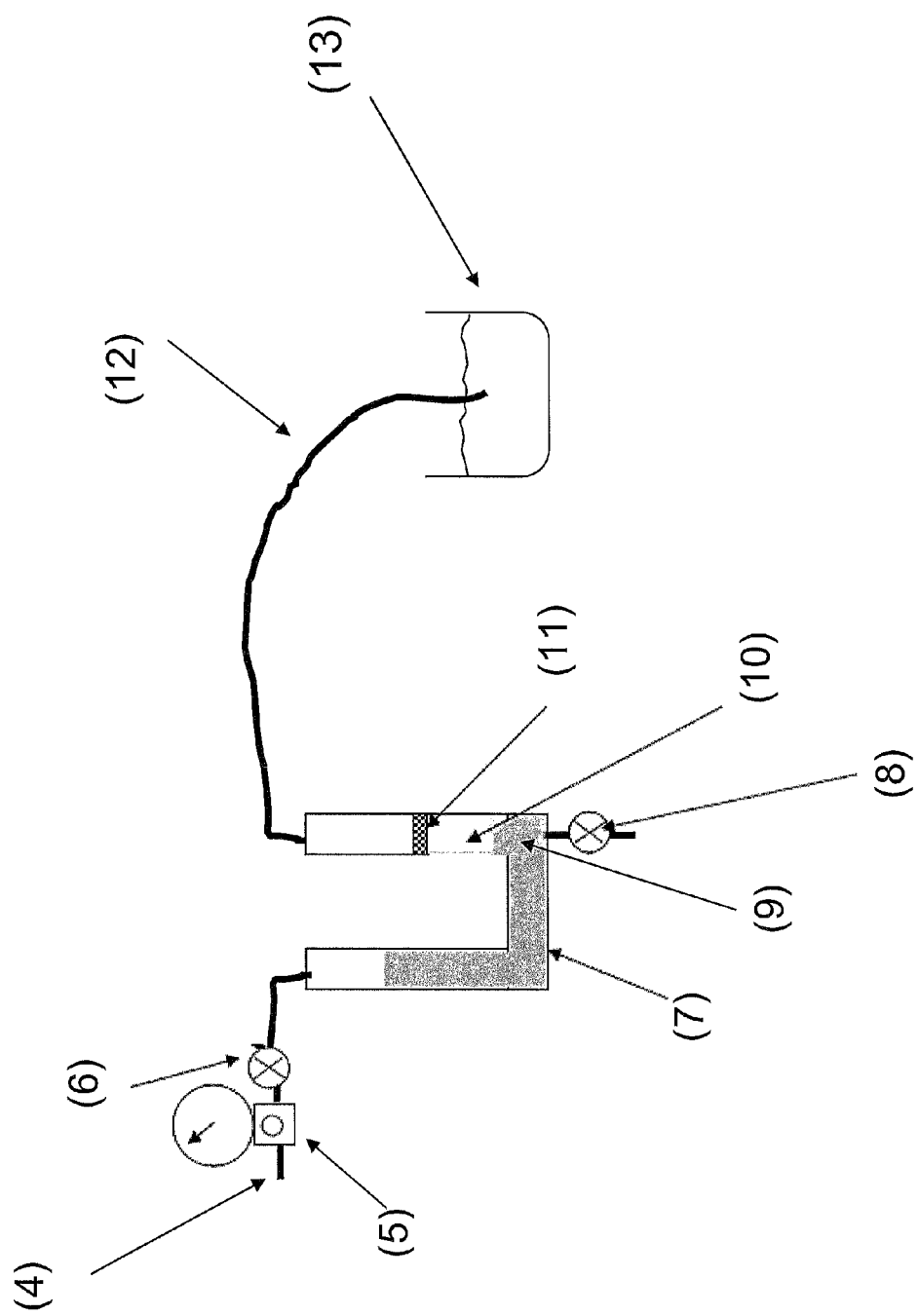
FIG. 2 is a schematic of the support structure test apparatus.
Figure 3:
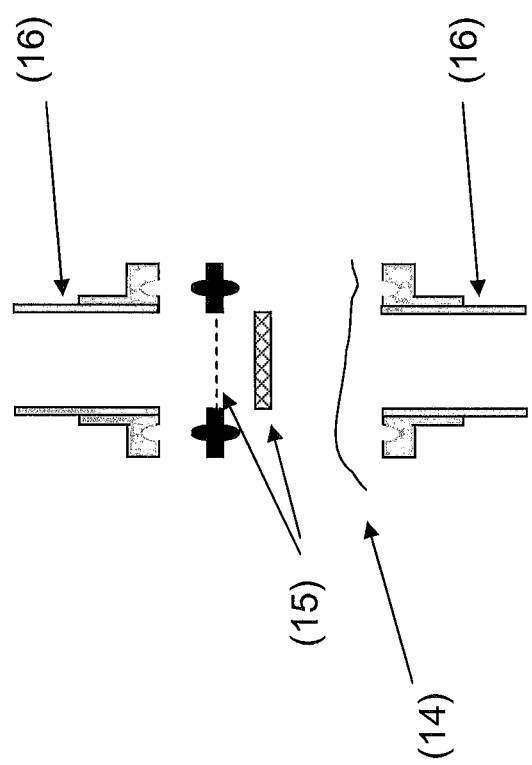
FIG. 3 is schematic diagram of the inventive sample mounting configuration in support structure fuel wet water challenge test apparatus.

The membrane of example 6, was mounted on a 20 mesh support screen for the water penetration support structure challenge as shown in FIG. 2. The sample was tested per the Water Penetration Challenge Support Structure Test method described above and exhibited a water penetration pressure of 90 psi for Jet fuel (IFT=39.9 mN/m (0.029 lb/ft)). The stainless steel mesh had a manufacturer reported opening size of 841 microns based on the weave and a burst strength >400 psi.

Example 8

The membrane of example 6, was mounted on a 40 mesh support screen for the water penetration support structure challenge as shown in FIG. 2. The sample was tested per the described test method and exhibited a water penetration pressure of 150 psi for Jet fuel (IFT=39.9 mN/m (0.029 lb/ft)) The stainless steel mesh had a manufacturer reported opening size of 400 microns based on the weave and a burst strength >400 psi.

Example 9

The membrane of example 6, was mounted on a 270 mesh support screen for the water penetration support structure challenge as shown in FIG. 2. The sample was tested per the Water Penetration Challenge Support Structure Test method described above and exhibited a water penetration pressure of 175 psi for Jet fuel (IFT=39.9 mN/m (0.029 lb/ft)). The stainless steel mesh had a manufacturer reported opening size of 53 microns based on the weave and a burst strength >400 psi.

Example 10

The membrane of example 6, was mounted on a 400 mesh support screen for the water penetration support structure challenge as shown in FIG. 2. The sample was tested per the Water Penetration Challenge Support Structure Test method described above and exhibited a water penetration pressure of 195 psi for Jet fuel (IFT=39.9 mN/m (0.029 lb/ft)). The stainless steel mesh had a manufacturer reported opening size of 37 microns based on the weave and a burst strength >400 psi.

Example 11

A three layer composite ePTFE membrane was made by processes described in U.S. Pat. No. 7,306,729. The composite membrane had an average matrix tensile strength of 13552 (PSI), an ATEQ airflow of 154.9 L/h, a bubble point of 24.9 psi, a porosity of 80%, a thickness of 1.4 mil, mass/area of 15.6 g/m², and pore size of 0.191 microns. The membrane above was mounted on a 5 micron opening woven support to form a composite and tested as described in the FWWPP test method presented above. The membrane resisted water penetration to its FWWPP value of 40.2 psi in ULSD and 53.5 psi in Jet fuel. Its average water penetration resistance FWWPP/IFT value was 2598 PSI/(lb/ft).

Example 12

A three layer composite ePTFE membrane was made by processes described in U.S. Pat. No. 7,306,729. The composite membrane had an average matrix tensile strength of 13798 (PSI), an ATEQ airflow of 74.9 L/h, a bubble point of 34.8 psi, a porosity of 81%, a thickness of 1.6 mil, mass/area of 16.7 g/m², and pore size of 0.147 microns. The membrane above was mounted on a 5 micron opening woven support to form a composite and tested as described in the FWWPP test method presented above. The membrane resisted water penetration to its FWWPP value of 60.5 psi in ULSD and 77.7 psi in Jet fuel. Its average water penetration resistance FWWPP/IFT value was 3861 PSI/(lb/ft).

Example 13

A monolithic ePTFE membrane was made by processes described in U.S. Pat. No. 7,306,729. The membrane had an average matrix tensile strength of 56378 (PSI), an ATEQ airflow of 39.5 L/h, a bubble point of 50.2 psi, a porosity of 87%, a thickness of 0.2 mil, mass/area of 1.5 g/m², and pore size of 0.18 microns. The membrane above was mounted on a 5 micron opening woven support to form a composite and tested as described in the FWWPP test method presented above. The membrane resisted water penetration to its FWWPP value of 70.3 psi in ULSD and 115.7 psi in Jet fuel. Its average water penetration resistance FWWPP/IFT value was 4925 PSI/(lb/ft).

Example 14

A three layer composite ePTFE membrane was made by processes described in U.S. Pat. No. 7,306,729. The membrane had an average matrix tensile strength of 14738 (PSI), an ATEQ airflow of 56.3 L/h, a bubble point of 50.079 psi, a porosity of 82%, a thickness of 2.5 mil, mass/area of 25.6 g/m², and pore size of 0.142 microns. The membrane above was mounted on a 5 micron opening woven support to form a composite and tested as described in the FWWPP test method presented above. The membrane resisted water penetration to its
FWWPP value of 106.3 psi in ULSD and 133.8 psi in Jet fuel. Its average water penetration resistance FWWPP/IFT value was 6737 PSI/(lb/ft).

Example 15

A monolithic ePTFE membrane was made by processes described in U.S. Pat. No. 7,306,729. The membrane had an average matrix tensile strength of 51838 (PSI), an ATEQ airflow of 17.3 L/h, a bubble point of 66.64 psi, a porosity of 82%, a thickness of 0.4 mil, mass/area of 4.0 g/m², and pore size of 0.121 microns. The membrane above was mounted on a 5 micron opening woven support to form a composite and tested as described in the FWWPP test method presented above. The membrane resisted water penetration to its FWWPP value of 105.7 psi in ULSD and 184 psi in Jet fuel. Its average water penetration resistance FWWPP/IFT value was 7577 PSI/(lb/ft).

Example 16

The monolithic ePTFE membrane of example 6 mounted on a 5 micron opening woven support to form a composite and tested as described in the FWWPP test method presented above. The membrane resisted water penetration to its FWWPP value of 129.1 psi in ULSD and 207.7 psi in Jet fuel. Its average water penetration resistance FWWPP/IFT value was 8961 PSI/(lb/ft).

Example 17

A monolithic ePTFE membrane was made by processes described in U.S. Pat. No. 7,306,729. The membrane had an average matrix tensile strength of 58097 (PSI), an ATEQ airflow of 22.6 L/h, a bubble point of 84.7 psi, a porosity of 77%, a thickness of 0.18 mil, mass/area of 2.3 g/m², and pore size of 0.106 microns. The membrane above was mounted on a 5 micron opening woven support to form a composite and tested as described in the FWWPP test method presented above. The membrane resisted water penetration to its FWWPP value of 118.9 psi in ULSD and 199.2 psi in Jet fuel. Its average water penetration resistance FWWPP/IFT value was 8390 PSI/(lb/ft).

Example 18

A monolithic ePTFE membrane was made by processes described in U.S. Pat. No. 7,306,729. The membrane had an average matrix tensile strength of 51013 (PSI), an ATEQ airflow of 4.5 L/h, a bubble point of 115.5 psi, a porosity of 69%, a thickness of 0.5 mil, mass/area of 8.7 g/m², and pore size of 0.061 microns. The membrane above was mounted on a 5 micron opening woven support to form a composite and tested as described in the FWWPP test method presented above. The membrane resisted water penetration to its FWWPP value of 290.7 psi in ULSD. Its average water penetration resistance FWWPP/IFT value was 24226 PSI/(lb/ft).

Example 19

Figure 5:
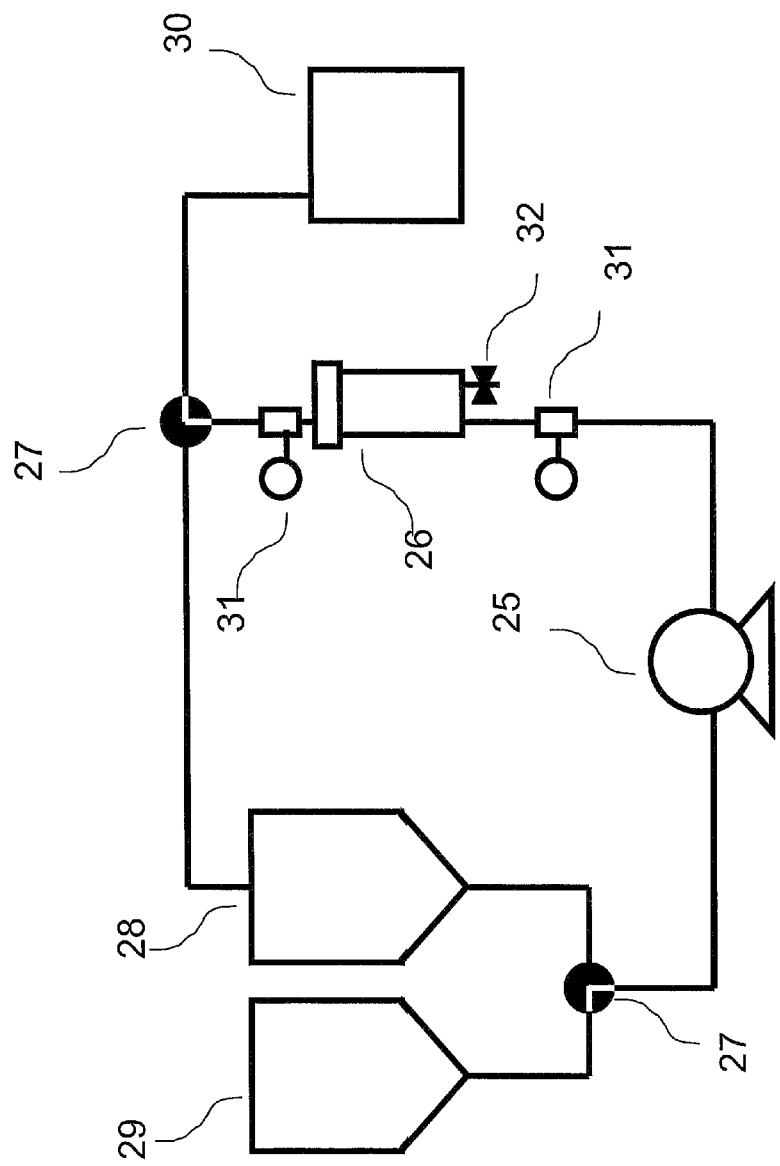
FIG. 5 is a schematic diagram detailing the full scale element water slug test apparatus.
Figure 6:
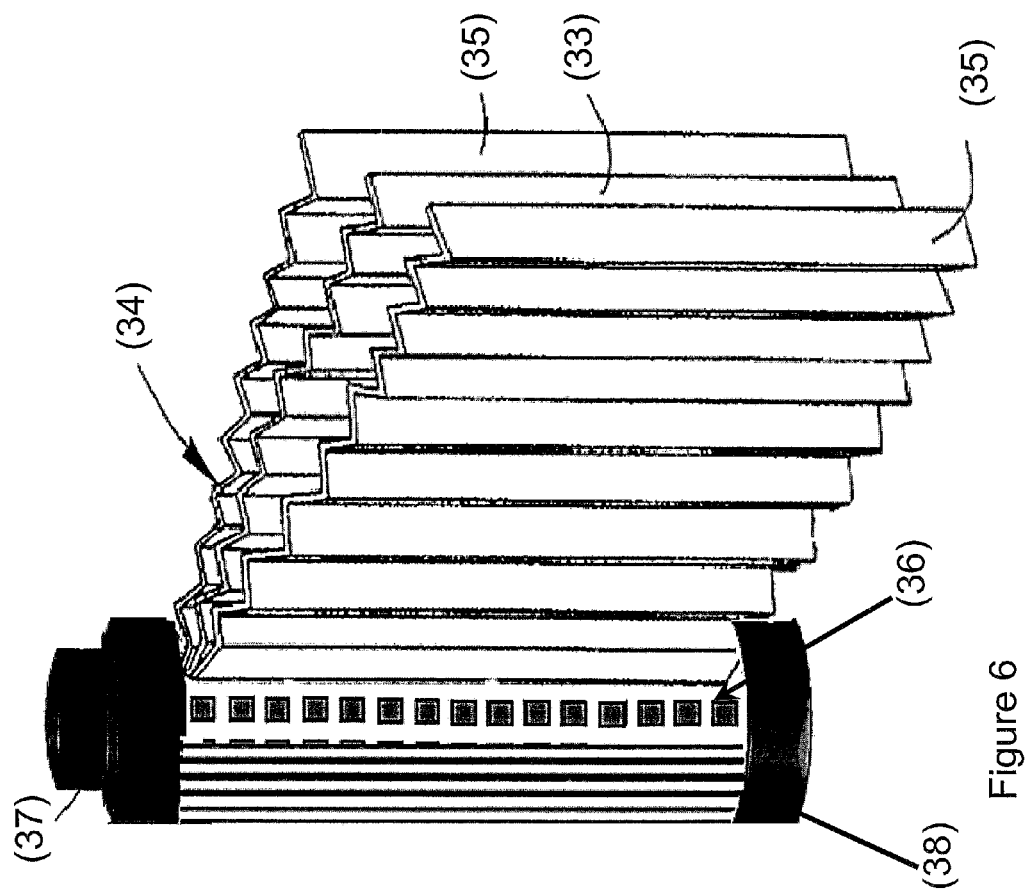
FIG. 6 is an illustration of another exemplary embodiment of the present invention in a pleated element form.
Figure 7:
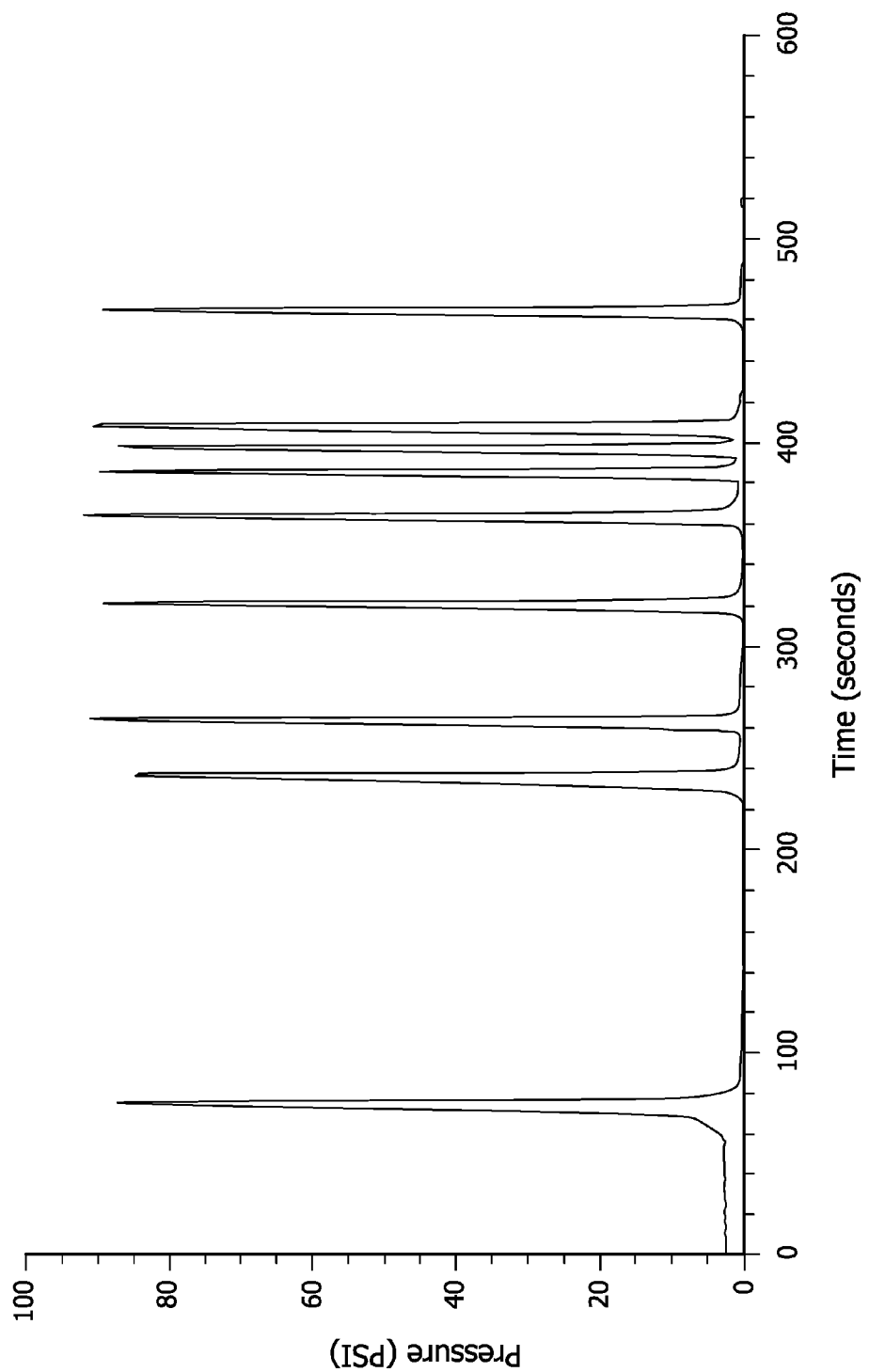
FIG. 7 is a trace of the differential pressure across the embodiment of the present invention (depicted in FIG. 6) during pressure pulsation in the full scale element water challenge test.

The three layer composite ePTFE membrane of example 13 was assembled into a filter element represented in FIG. 6. The membrane was then pleated between two layers of Fiberweb Typar 3151 PP spunbond nonwoven (described above) with alternating 12 and 10 mm pleat heights. A pleat pack of 94 pleats was seam sealed using Loctite 5 minute epoxy mixed less than 10% acetone. This pleat pack was potted leaving a 101 mm length of pleat height unpotted between the caps to create the element depicted in FIG. 6. Here the ePTFE membrane (33), is pleated (34) between layers of nonwoven (35), where one layer of the nonwoven (35) and a plastic core (36), are disposed downstream of the ePTFE and serve as a support. Herein the pleat pack of ePTFE and nonwovens are disposed radially about the tubular plastic support. The pleat pack is seam sealed and potted into the end caps, the open end cap (37) and the blind bottom end cap (38), so as to provide an integral filter element suitable for inside out flow. The inventive monitor owing to its thinner media as assembled has a filter area of ~2000 cm² per 6 inch length at a 2 inch outer diameter, as compared to the prior art incumbent filter monitor which has less than 300 cm² at the same volume. Potting was accomplished using the same 5 minute epoxy and acetone described above in conductive polymer end caps in accordance with specifications described in the teachings of EI 1583 (Energy Institute Document 1583: laboratory tests and minimum performance specifications for aviation fuel filter monitors 6$^{th}$ edition) with a perforated PVC support cage with an OD=1 inch and ID=0.75 inches and 30% open area. This pleated filter element was installed in a Gammon Technical Products GTP SK-853 housing (for a 2" od by 6" length fuel filter monitor). The filter was primed by recirculation of Jet fuel +2% DIEGME for 30 minutes using the low flow water stream challenge set up. The element was then challenged with a water slug by switching the upstream valve 4 in FIG. 5 from fuel to water feed and the downstream valve 4 in FIG. 5 to a collection vessel. Pressure was observed to rapidly rise to >90 psi in 20 seconds, as shown in pressure trace of FIG. 7 and flow was observed to stop. The pump was shut off after pressure reached >90 psi. The pump was then turned on resulting in another >90 psi pressure spike, and shut off again. This sequence was repeated for a total of 8 additional pressure spikes after the first as can be seen in the pressure trace of FIG. 7. Afterward the downstream fluid was decanted into the collection vessel. The fuel was observed to be clear and bright. A few drops of water passing the filter were separated from the fuel using a separatory funnel. The water and fuel were quantified gravimetrically yielding 450 ml of fuel and less than 1 ml of water.

Figure 8:
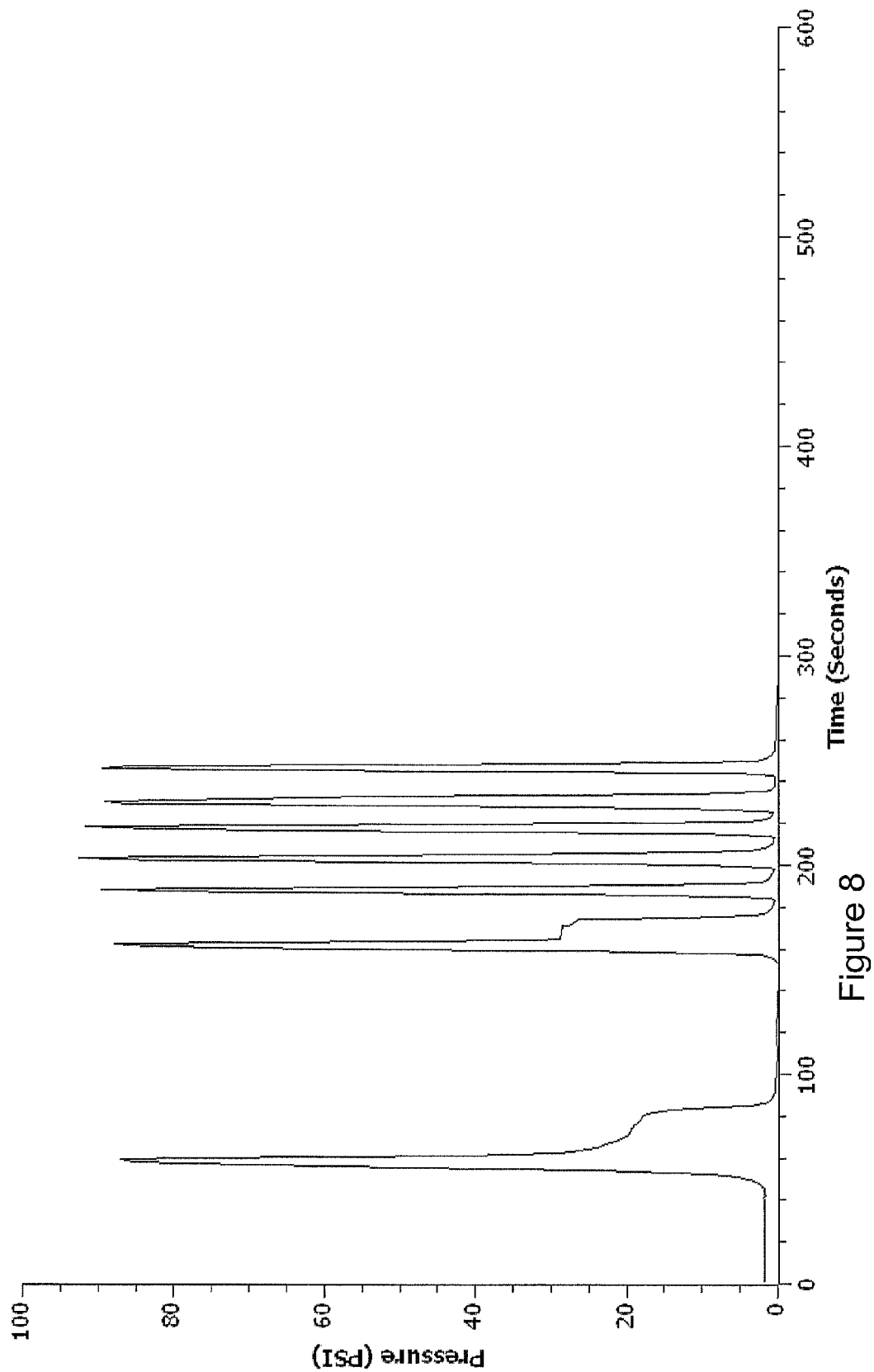
FIG. 8 is a trace of the differential pressure across the embodiment of the present invention (depicted in FIG. 2) during pressure pulsation in the full scale element water challenge test conducted after draining water from the housing following the test in FIG. 7.

The water was drained from the upstream of the monitor housing and the valve 4 upstream in FIG. 5 was switched to the fuel feed. Fuel was recirculated again for 30 minutes (note dP was ~1.8 PSI comparable to recirculation dP before the water challenge). The element was then challenged with a water slug by switching the upstream valve 4 in FIG. 5 from fuel to water feed and the downstream valve 4 in FIG. 5 to a collection vessel. Pressure was observed to rapidly rise to >90 PSI in 20 seconds, as shown in FIG. 8 and flow was observed to stop. The pump was shut off after pressure reached >90 PSI. The pump was then turned on resulting in another >90 PSI pressure spike, and shut off again. This sequence was repeated for a total of 6 additional pressure spikes after the first as seen in the pressure trace of FIG. 8.

Comparative Example 1

A disc was die cut from a non-woven filter media Ahlstrom 220-PSFFL-A filter media comprised of polyester microfibers and a cellulose microglass wetlaid composite cured with a phenol formaldehyde resin. The material has manufacturer reported specifications of basis weight of approximately 166 lb/3000 ft$^2$, a 36 mil thickness, and 60 psi cured burst strength. The ATEQ airflow through the media was measured to be 48.9 L/h. The material was analyzed by gas liquid porometery as described above and had a bubble point of 1.21 PSI and a mean flow pore size of 4.66 microns. A disc was die cut from the media and mounted on a support and tested as described in the FWWPP test method presented above. The disc resisted water penetration to its FWWPP value of 0.8 psi in ULSD. Its average water penetration resistance FWWPP/IFT value was 68 PSI/(lb/ft).

Comparative Example 2

A commercial two stage water filter separator Ford FD-4165 was obtained. The filter is comprised of an outer nonwoven media pleated with an inner woven screen media sealed to apertures in a solid inner core. The outer media is a composite comprised of a multilayer composite of fine fiber polyester nonwoven and wet-laid cellulose non-woven. The woven media on the element core is a hydrophobic screen for this example a disc was die cut from the outer layer of nonwoven media. The ATEQ airflow through the media was measured to be 41.0 L/h. The material was analyzed by gas liquid porometery as described above and had a bubble point of 0.83 PSI and a mean flow pore size of 5.33 microns. A disc was die cut from the media and mounted on a support and tested as described in the FWWPP test method presented above. The disc resisted water penetration to its FWWPP value of 0.7 psi in ULSD. Its average water penetration resistance FWWPP/IFT value was 55 PSI/(lb/ft).

Comparative Example 3

A disc was die cut from a non-woven filter media layer comprised of a polypropylene fine fiber meltblown 30 grams per square meter basis weight and Neenah Gessner K13B50A filter media comprised of a 50 g/m$^2$ polyester meltblown and a wet-laid cellulose paper layer impregnated with a phenolic resin. K13B50A is characterized by a 285 grams per square meter basis weight, and 0.75 mm thickness. The ATEQ airflow through the media was measured to be 40.2 L/h. The material was analyzed by gas liquid porometery as described above and had a bubble point of 1.23 PSI and a mean flow pore size of 6.63 microns. A disc was die cut from the media and mounted on a support and tested as described in the FWWPP test method presented above. The disc resisted water penetration to its FWWPP value of 0.7 psi in ULSD. Its average water penetration resistance FWWPP/IFT value was 57 PSI/(lb/ft).

Comparative Example 4

A disc was die cut from a non-woven filter media layer comprised of Lydall Lypore 9221-NA a filter media comprised of wet-laid microglass and polyester spunbond. Lypore 9221-NA is characterized by a manufacturer reported 6 mm mean flow pore size, 48 lbs/3000 sqft basis weight, and 16 mil thickness. The ATEQ airflow through the media was measured to be 364.8 L/h. The material was analyzed by gas liquid porometery as described above and had a bubble point of 1.24 PSI and a mean flow pore size of 6.3 microns. A disc was die cut from the media and mounted on a support and tested as described in the FWWPP test method presented above. The disc resisted water penetration to its FWWPP value of 0.4 psi in ULSD. Its average water penetration resistance FWWPP/IFT value was 35 PSI/(lb/ft).

Comparative Example 5

A disc was die cut from a non-woven filter media Ahlstrom 220P-A filter media comprised of a cellulose wetlaid nonwoven cured with a phenol formaldehyde resin. The ATEQ airflow through the media was measured to be 52.8 L/h. The material was analyzed by gas liquid porometery as described above and had a bubble point of 1.19 PSI and a mean flow pore size of 5.71 microns. A disc was die cut from the media and mounted on a support and tested as described in the FWWPP test method presented above. The disc resisted water penetration to its FWWPP value of 0.4 psi in ULSD. Its average water penetration resistance FWWPP/IFT value was 35 PSI/(lb/ft).

Comparative Example 6

Figure 9:
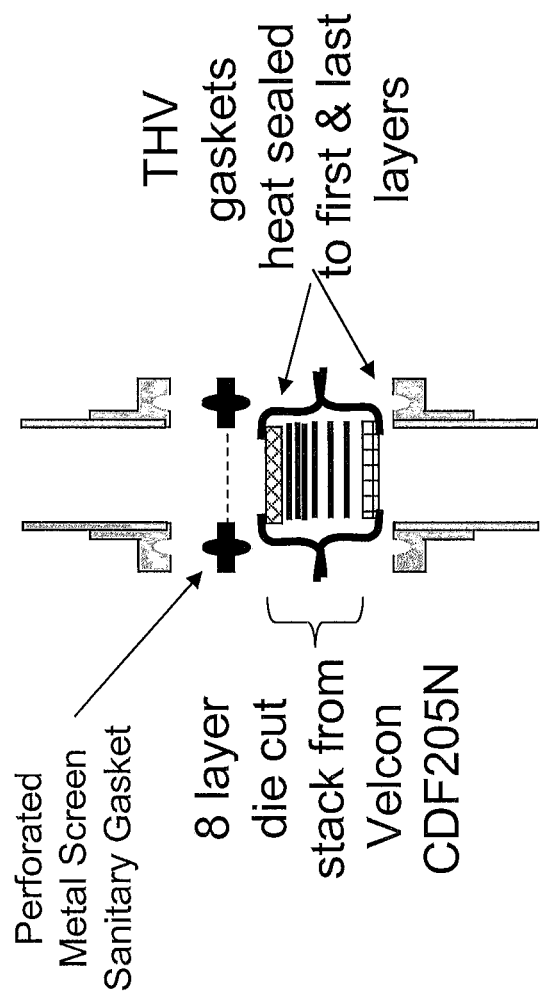
FIG. 9 is schematic diagram of the prior art sample mounting configuration in the high flow water stream test apparatus.

An 8 layer stack was die cut from a Velcon cdf 205 n 6 inch filter monitor and with layers 1 and 8 sealed to thy gaskets and sealed together as shown in FIG. 9. The nonwoven stack was mounted with the inside face of the monitor, layer 1 of the stack mounted on a support. The ATEQ airflow through the media was measured to be 132.6 L/h in pristine condition, but decreased with exposure to humid air ranging from 10-40 L/h. The material was too thick to analyze via gas liquid porometery, but has a nominal pore size of 0.5 microns assigned by the manufacturer. A stack mounted on a support and the edges heat sealed with a THV gasket and tested as described in the FWWPP test method presented above. The disc resisted water penetration to its FWWPP value of 154.7 psi in jet fuel. Its average water penetration resistance FWWPP/IFT value was 5335 PSI/(lb/ft). Exposure to water irreversibly swelled the material rendering it impermeable to air.

Comparative Example 7

A monolithic ePTFE membrane was made by processes known in the art for example U.S. Pat. No. 3,953,566 or U.S. Pat. No. 5,814,405. The membrane had an average matrix tensile strength of 16010 (PSI), an ATEQ airflow of 529.8 L/h, a bubble point of 1.57 psi, a porosity of 94%, a thickness of 1 mil, mass/area of 3.3 g/m$^2$, and pore size of 2.61 microns. The membrane above was mounted on a woven support to form a composite and tested as described in the FWWPP test method presented above. The membrane resisted water penetration to its FWWPP value of 2.2 psi in ULSD and 2.7 psi in Jet fuel. Its average water penetration resistance FWWPP/IFT value was 139 PSI/(lb/ft).

Comparative Example 8

A monolithic ePTFE membrane was made by processes known in the art for example U.S. Pat. No. 3,953,566 or U.S. Pat. No. 5,814,405. The membrane had an average matrix tensile strength of 5137 (PSI), an ATEQ airflow of 598.3 L/h, a bubble point of 2.12 psi, a porosity of 87%, a thickness of 0.8 mil, mass/area of 5.7 g/m$^2$, and pore size of 2.77 microns. The membrane above was mounted on a woven support to form a composite and tested as described in the FWWPP test method presented above. The membrane resisted water penetration to its FWWPP value of 1.9 psi in ULSD and 3.6 psi in Jet fuel. Its average water penetration resistance FWWPP/IFT value was 140 PSI/(lb/ft).

Comparative Example 9

A monolithic ePTFE membrane was made by processes known in the art for example U.S. Pat. No. 3,953,566 or U.S. Pat. No. 5,814,405. The membrane had an average matrix tensile strength of 5845 (PSI), an ATEQ airflow of 324.6 L/h, a bubble point of 4.01 psi, a porosity of 91%, a thickness of 1.1 mil, mass/area of 5.2 g/m$^2$, and pore size of 1.09 microns. The membrane above was mounted on a woven support to form a composite and tested as described in the FWWPP test method presented above. The membrane resisted water penetration to its FWWPP value of 4.9 psi in ULSD and 6.6 psi in Jet fuel. Its average water penetration resistance FWWPP/IFT value was 319 PSI/(lb/ft).

Comparative Example 10

A monolithic ePTFE membrane was made by processes known in the art for example U.S. Pat. No. 3,953,566 or U.S. Pat. No. 5,814,405. The membrane had an average matrix tensile strength of 8561 (PSI), an ATEQ airflow of 38.3 L/h, a bubble point of 9.07 psi, a porosity of 91%, a thickness of 4.5 mil, mass/area of 22.8 g/m$^2$, and pore size of 0.529 microns. The membrane above was mounted on a woven support to form a composite and tested as described in the FWWPP test method presented above. The membrane resisted water penetration to its FWWPP value of 13.6 psi in ULSD and 23.1 psi in Jet fuel. Its average water penetration resistance FWWPP/IFT value was 966 PSI/(lb/ft).

Comparative Example 11

A monolithic ePTFE membrane was made by processes known in the art for example U.S. Pat. No. 3,953,566 or U.S. Pat. No. 5,814,405. The membrane had an average matrix tensile strength of 24551 (PSI), an ATEQ airflow of 60.1 L/h, a bubble point of 8.7 psi, a porosity of 88%, a thickness of 1.4 mil, mass/area of 9.2 g/m$^2$, and mean flow pore size of 0.508 microns. The membrane above was mounted on a woven support to form a composite and tested as described in the FWWPP test method presented above. The membrane resisted water penetration to its FWWPP value of 10.4 psi in ULSD and 28.8 psi in Jet fuel. Its average water penetration resistance FWWPP/IFT value was 931 PSI/(lb/ft).

Comparative Example 12

A monolithic ePTFE membrane was made by processes known in the art for example U.S. Pat. No. 3,953,566 or U.S. Pat. No. 5,814,405. The membrane had an average matrix tensile strength of 7428 (PSI), an ATEQ airflow of 21.5 L/h, a bubble point of 11.55 psi, a porosity of 87%, a thickness of 2.6 mil, mass/area of 19.3 g/m$^2$, and mean flow pore size of 0.418 microns.

The membrane above was mounted on a woven support to form a composite and tested as described in the FWWPP test method presented above. The membrane resisted water penetration to its FWWPP value of 15.3 psi in ULSD and 34.9 psi in Jet fuel. Its average water penetration resistance FWWPP/IFT value was 1240 PSI/(lb/ft).

Comparative Example 13

A monolithic ePTFE membrane was made by processes known in the art for example U.S. Pat. No. 3,953,566 or U.S. Pat. No. 5,814,405. The membrane had an average matrix tensile strength of 18726 (PSI), an ATEQ airflow of 10.2 L/h, a bubble point of 32 psi, a porosity of 88%, a thickness of 1.99 mil, mass/area of 13 g/m$^2$, and mean flow pore size of 0.184 microns. The membrane above was mounted on a woven support to form a composite and tested as described in the FWWPP test method presented above. The membrane resisted water penetration to its FWWPP value of 60.6 psi in ULSD and 81.1 psi in Jet fuel. Its average water penetration resistance FWWPP/IFT value was 3924 PSI/(lb/ft).

Comparative Example 14

Figure 10:
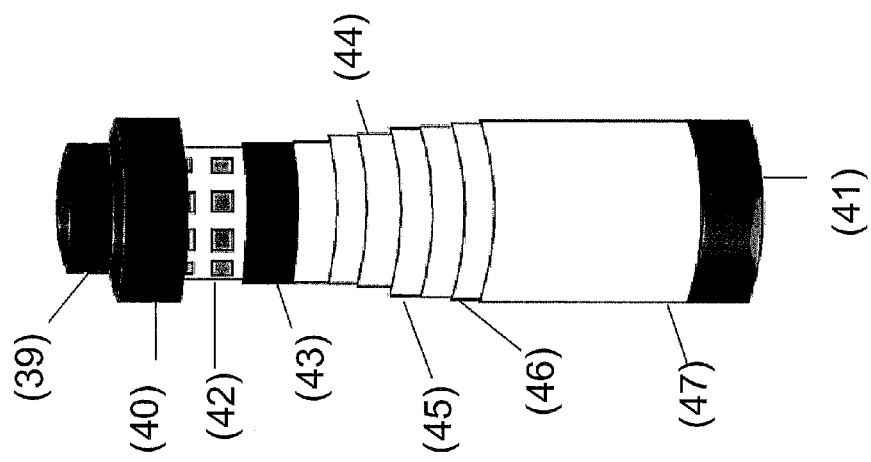
FIG. 10 is an illustration of an exemplary embodiment of the prior art of a typical commercial fuel filter monitor element.
Figure 11:
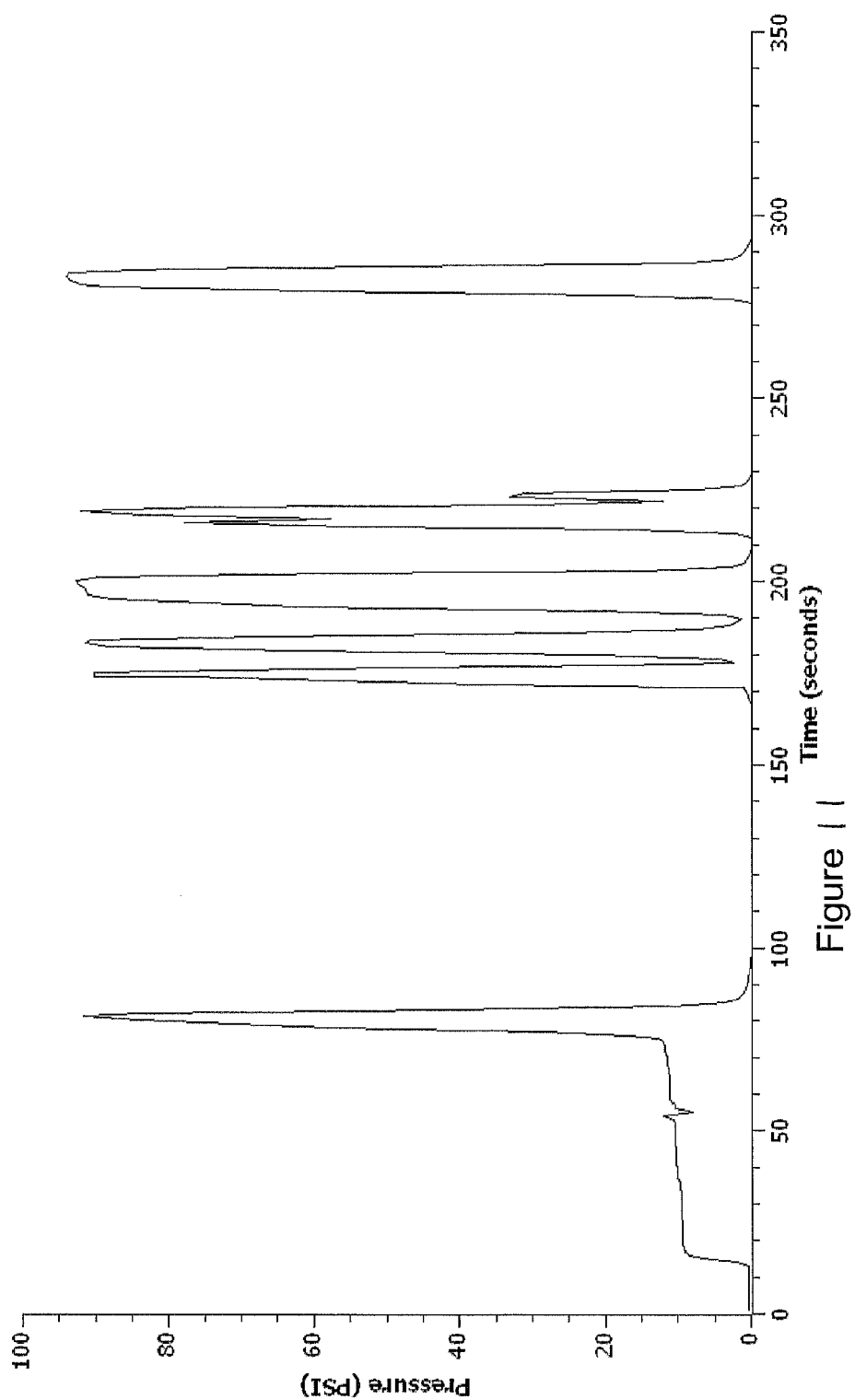
FIG. 11 is a trace of the differential pressure across the embodiment of the present invention during pressure pulsation in the full scale element water challenge test.

A Velcon cdf 205 n 6 inch filter monitor element depicted in FIG. 10 was installed in a Gammon Technical Products 6 inch fuel filter monitor housing. FIG. 10 shows the cylindrical construction of a typical commercial fuel filter monitor seam sealed and potted in a filter element. Wherein, the element is comprised of the o-ring (39), on the open end cap (40), the blind end cap (41) and the various filters layers with support structure. The layers start with the rigid plastic support tube/core (42), followed by a high strength small pore size non-woven layer (43), water absorbent SAP layers (44), a support scrim (45), various nonwoven filter layers (46), and outer sock (47) The filter area for a typical element of ~6 inch length as depicted is 200 cm$^2$. Comparison of FIG. 10 to FIG. 62 illustrates yet another advantage of the inventive monitor which is that due to its lower inherent thickness the inventive monitor allows for a pleated construction comprising more area in the same volume space. The filter was primed by recirculation of Jet fuel +2% DIEGME for 30 minutes using the low flow water stream challenge set up in FIG. 5. The element was then challenged with a water slug by switching the upstream valve (27) from fuel to water feed and the downstream valve (27) to a collection vessel. Pressure was observed to rapidly rise to >90 psi in a few seconds, as shown in the pressure trace of FIG. 11 and flow was observed to stop. The pump was shut off after pressure reached >90 PSI. The pump was then turned on resulting in another >90 PSI pressure spike, and shut off again. This sequence was repeated for a total of 6 additional pressure spikes after the first as seen the pressure trace of FIG. 11. Afterward the downstream fluid was decanted into the collection vessel. Drops of water passing the filter were separated from the fuel using a separatory funnel. The water and fuel were quantified gravimetrically yielding 450 ml of fuel and 14.5 ml of water. The water was drained from the upstream of the monitor housing and the valve (32) in FIG. 5 was switched to the fuel feed. This resulted in a pressure spike>90 PSI and testing was discontinued.

Discussion of Example Test Results

Discussion Support Structure Testing

Figure 12:
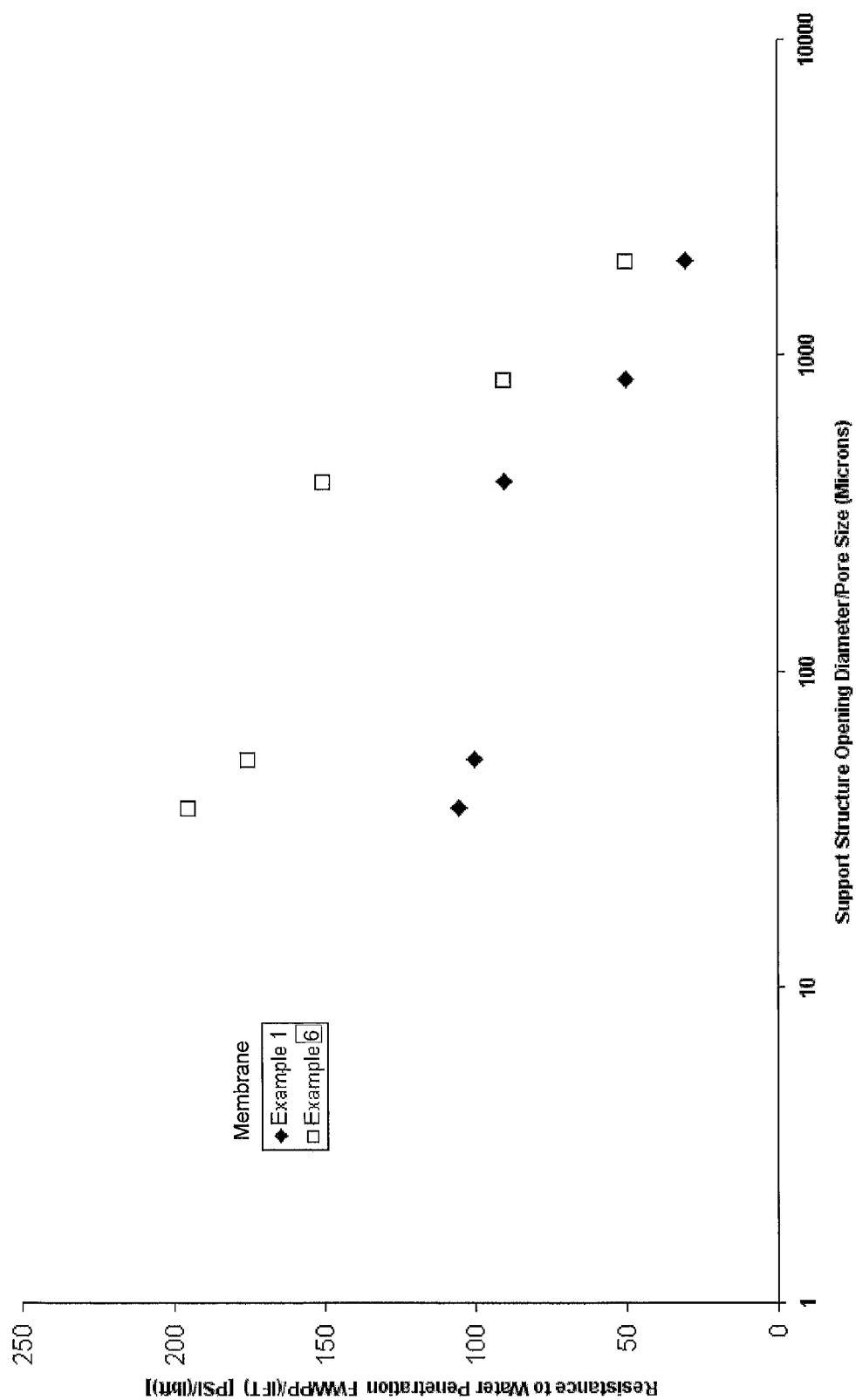
FIG. 12 is a plot of resistance to water penetration versus support structure opening or pore size from the water penetration support structure test.
Figure 13:
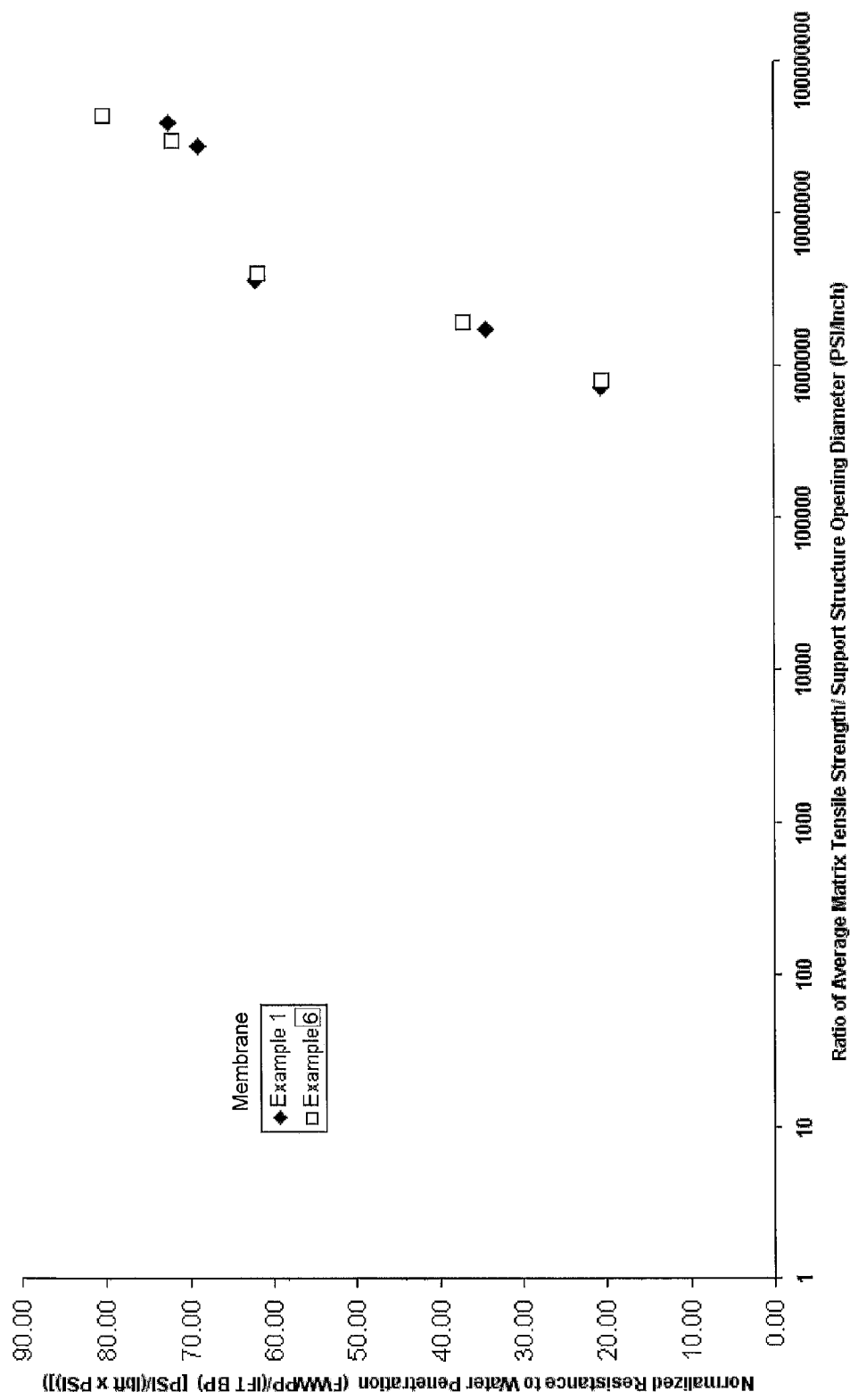
FIG. 13 is a plot of resistance to water penetration versus the membrane matrix tensile strength normalized by the support structure opening or pore size from the water penetration support structure test.

Examples 1 to 10 are summarized in table 1. These examples highlight one necessary characteristic of the invention required to obtain a high resistance to water penetration when wet with fuel. Specifically, it has been discovered that to obtain the high fuel wet water penetration resistance, in excess of prior art composites, it is necessary for the support structure to have certain characteristics. The first characteristic is that the support must have a burst strength higher than the minimum FWWPP as measured by the Mullen burst test. Second is that the inventive composite must have a minimum equivalent opening diameter or effective pore size, otherwise a high fuel wet water penetration pressure (FWWPP) will not be obtained. This is illustrated in FIG. 12. This figure shows the fuel wet water entry pressure of composites of two different ePTFE membranes supported by woven meshes with different diameter openings or effective pore sizes. The figure shows that as opening size decreases the obtained fuel wet water entry pressure increases. We have discovered that novel composites with High Fuel Wet Water Penetration Pressure (FWWPP) satisfy the general relation that the ratio of Matrix Tensile strength/opening diameter>$10^5$ (PSI/inch) at least. More preferably the ratio of Matrix Tensile strength/opening diameter>$10^6$ (PSI/inch). Most preferably the ratio of Matrix Tensile strength/opening diameter>$10^7$ (PSI/inch). This can be seen in FIG. 13 which plots the fuel wet water entry pressure of the composites normalized by bubble point versus the ratio of Matrix Tensile strength/opening diameter. As shown in FIG. 13 the normalized entry pressure of the novel composites follows the discovered general relationship and only for composites with a ratio of Matrix Tensile strength/opening diameter>$10^6$ (PSI/inch) are high fuel wet entry pressures greater than the prior art obtained.

Discussion FWWPP Test

Examples 11-18 and Comparative examples 1-13 are summarized in table 2. These examples serve to illustrate the novel increase in water penetration resistance provided by the inventive composites in comparison to the prior art, exemplified here as the ratio of the FWWPP test value to the measured fuel IFT as described above. Comparative examples 1 through 5 represent typical state of the art fuel filter and filter water separator materials found in commerce today. These include wetlaid paper, microfiber glass composites, and more complex microfiberglass/paper/meltblown nonwoven composites which include a hydrophobic coating. As can be seen none of these offer significant fuel wet water penetration resistance e.g. FWWPP/IFT<70 PSI/(lb/ft).

Example 6 represents a state of the art 8 layer nonwoven construct from an aviation fuel filter monitor which contains a Super Absorbent Polymer for water. It can be seen that this filter offers a superior fuel wet water penetration resistance e.g. FWWPP/IFT of 5335 PSI/(lb/ft). In addition in its pristine state it offers a low flow resistance (as indicated in table 2). However, it has the drawback of increasing flow resistance with water exposure, and is effectively a single use device, being rendered ineffective after contact with a single exposure to water at elevated concentration. Furthermore, SAP devices have been shown to leach polymer media or particulate with negative side effects and are incompatible with common polar additives and contaminants.

Figure 14:
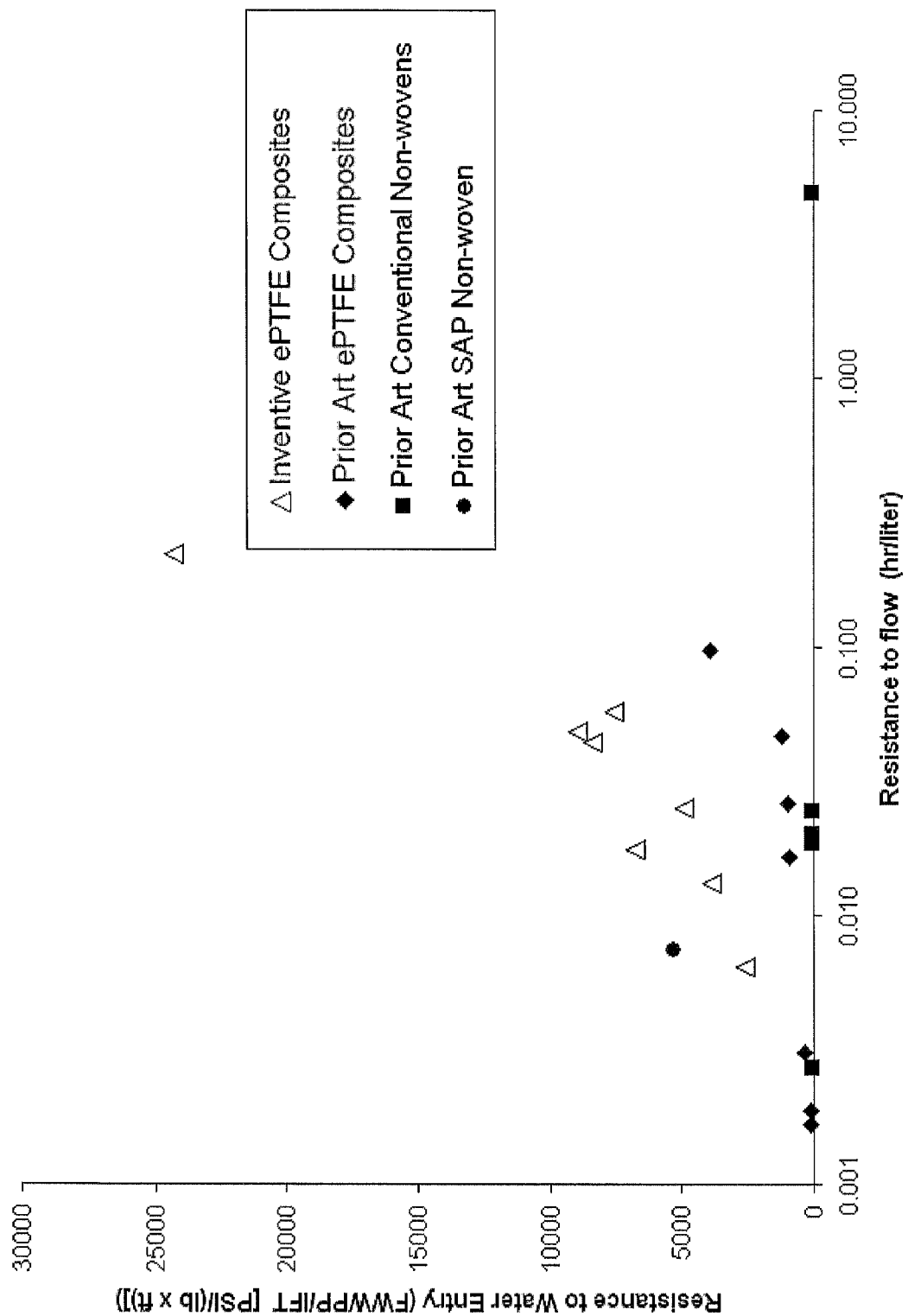
FIG. 14 is a plot of the resistance to water penetration versus the resistance to flow.
Figure 15:
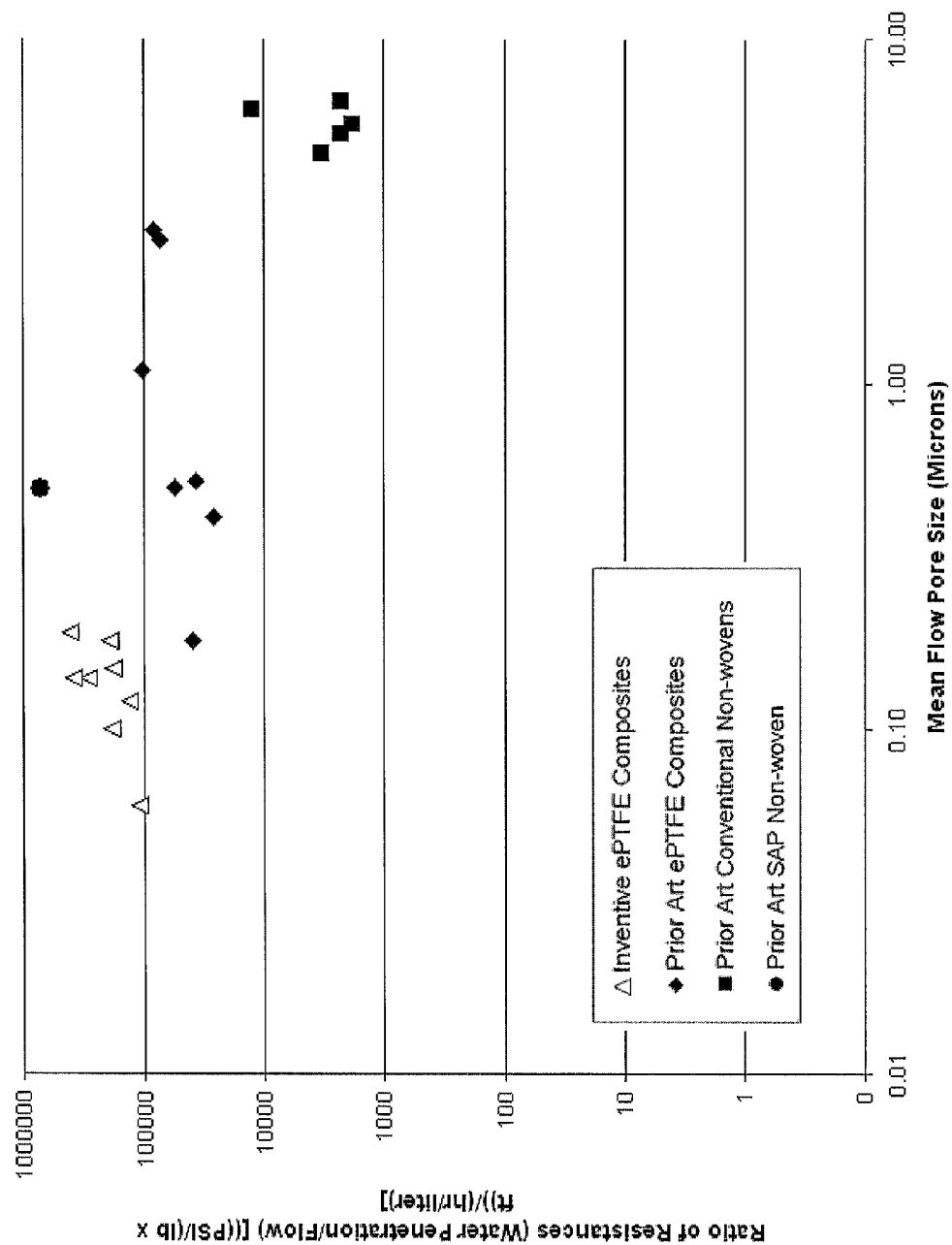
FIG. 15 is a plot of the Ratio of Resistances (Water Penetration/Flow) versus pore size.

Comparative examples 7-13 represent the prior art ePTFE composites. It can be seen that these examples offer fuel wet water penetration resistance e.g. FWWPP/IFT ranging from 140 to 3930 psi/lb ft.
However the higher water penetration resistant composites from 931 to 3930 psi/lb ft have the drawback of a relatively high flow resistance In comparison, examples 10-17 show the inventive composites. These composites exhibit a novel combination of water penetration resistance and flow resistance without the drawback of incorporating SAP polymer. FIG. 14 is a plot of water penetration resistance versus flow resistance and illustrates this differentiation. Clearly these composites have a novel combination of fuel wet water penetration resistance and low resistance to flow not seen in the prior art. Furthermore as seen in FIG. 15 these composites are also differentiated from the prior art in their reduced pore sizes.

Discussion Full Scale Example Test

Table 3 summarizes the results of low flow water stream challenges impinged on a novel inventive pleated fuel filter monitor of example 19 and comparative example 14 a conventional SAP containing fuel filter monitor. The results show clearly that the element provides superior resistance to water penetration compared to a modern day commercial fuel filter monitor containing SAP. Specifically the element passed significantly less water and was reusable after drainage. Moreover the element provided a significant reduction in resistance to flow as evidenced by a lower differential pressure.

TABLE 1

| Example | US mesh size | Support Opening Dimension/Pore Size (Microns) | (Inches) | Membrane | Membrane Bubble Point (PSI) | Membrane Matrix Tensile Strength (PSI) | Fuel Wet Water Penetration Pressure (PSI) | Resistance to Water Penetration (FWWPP/IFT [Psi/(lb/ft)]) | Normalized Resistance to Water Penetration (FWWPP/(IFT × BP) [PSI/((lb/ft) × PSI)]) | Ratio of Matrix Tensile Strength/Opening Diameter (PSI/inch) |
|---|---|---|---|---|---|---|---|---|---|---|
| Example 1 | 10 | 2000 | 0.08 | Example 1 | 50.2 | 56378 | 30 | 1034 | 20.61 | 716003 |
| Example 2 | 20 | 841 | 0.03 | Example 1 | 50.2 | 56378 | 50 | 1724 | 34.35 | 1702741 |
| Example 3 | 40 | 400 | 0.02 | Example 1 | 50.2 | 56378 | 90 | 3103 | 61.82 | 3580014 |
| Example 4 | 270 | 53 | 0.00 | Example 1 | 50.2 | 56378 | 100 | 3448 | 68.69 | 27018972 |
| Example 5 | 400 | 37 | 0.00 | Example 1 | 50.2 | 56378 | 105 | 3621 | 72.13 | 38702852 |
| Example 6 | 10 | 2000 | 0.08 | Example 6 | 84.2 | 63146 | 50 | 1724 | 20.48 | 801957 |
| Example 7 | 20 | 841 | 0.03 | Example 6 | 84.2 | 63146 | 90 | 3103 | 36.86 | 1907150 |
| Example 8 | 40 | 400 | 0.02 | Example 6 | 84.2 | 63146 | 150 | 5172 | 61.43 | 4009783 |
| Example 9 | 270 | 53 | 0.00 | Example 6 | 84.2 | 63146 | 175 | 6034 | 71.67 | 30262514 |
| Example 10 | 400 | 37 | 0.00 | Example 6 | 84.2 | 63146 | 195 | 6724 | 79.86 | 43349006 |

TABLE 2

| Example | Description | FWWPP (PSI) ULSD (IFT = 0.012 lb/ft) | FWWPP (PSI) Jet A (IFT = 0.029 lb/ft) | Resistance to Water Penetration (FWWPP/IFT [PSI/(lb/ft)]) | ATEQ airflow (L/hr) | Mean Flow Pore Size (microns) | Resistance to Flow (hr/liter) | Resistance Ratio (Water Penetration/Flow) [(PSI/(lb/ft))/(hr/liter)] |
|---|---|---|---|---|---|---|---|---|
| Example 11 | Inventive ePTFE Composite | 40.2 | 53.5 | 2598 | 154.9 | 0.19 | 0.006 | 402563 |
| Example 12 | Inventive ePTFE Composite | 60.5 | 77.7 | 3861 | 74.9 | 0.14 | 0.013 | 289346 |
| Example 13 | Inventive ePTFE Composite | 70.3 | 115.7 | 4925 | 39.5 | 0.18 | 0.025 | 194369 |
| Example 14 | Inventive ePTFE Composite | 106.3 | 133.8 | 6737 | 56.3 | 0.14 | 0.018 | 379515 |
| Example 15 | Inventive ePTFE Composite | 105.7 | 184.0 | 7577 | 17.3 | 0.12 | 0.058 | 131343 |
| Example 16 | Inventive ePTFE Composite | 129.1 | 207.7 | 8961 | 20.5 | 0.15 | 0.049 | 183702 |
| Example 17 | Inventive ePTFE Composite | 118.9 | 199.2 | 8390 | 22.6 | 0.10 | 0.044 | 189604 |
| Example 18 | Inventive ePTFE Composite | 290.7 | | 24226 | 4.5 | 0.06 | 0.222 | 109018 |
| Comparative Example 1 | Prior Art Nonwoven Hydrophobic Composite | 0.8 | | 68 | 48.9 | 4.66 | 0.020 | 3324 |
| Comparative Example 3 | Prior Art Nonwoven Hydrophobic Composite | 0.7 | | 57 | 40.2 | 6.63 | 0.025 | 2295 |
| Comparative Example 4 | Prior Art Microglass Non Woven | 0.4 | | 35 | 364.8 | 6.30 | 0.003 | 12617 |
| Comparative Example 5 | Prior Art Filter Paper Nonwoven | 0.4 | | 35 | 52.8 | 5.71 | 0.019 | 1827 |
| Comparative Example 2 | Prior Art Nonwoven Hydrophobic Composite | 0.7 | | 55 | 41.0 | 5.33 | 0.024 | 2272 |
| Compatative Example 6 | Prior Art Nonwoven Super Absorbent Composite | | 154.7 | 5335 | 132.6* | 0.5** | 0.008 | 707421 |
| Comparative Example 7 | Prior Art ePTFE Composite | 2.2 | 2.7 | 139 | 529.8 | 2.61 | 0.002 | 73702 |
| Comparative Example 8 | Prior Art ePTFE Composite | 1.9 | 3.6 | 140 | 598.3 | 2.77 | 0.002 | 83985 |
| Comparative Example 9 | Prior Art ePTFE Composite | 4.9 | 6.6 | 319 | 324.6 | 1.09 | 0.003 | 103497 |
| Comparative Example 10 | Prior Art ePTFE Composite | 13.6 | 23.1 | 966 | 38.3 | 0.52 | 0.026 | 37023 |
| Comparative Example 11 | Prior Art ePTFE Composite | 10.4 | 28.8 | 931 | 60.1 | 0.50 | 0.017 | 55970 |
| Comparative Example 12 | Prior Art ePTFE Composite | 15.3 | 34.9 | 1240 | 21.5 | 0.41 | 0.047 | 26662 |
| Comparative Example 13 | Prior Art ePTFE Composite | 60.6 | 81.1 | 3924 | 10.2 | 0.18 | 0.098 | 40026 |

*= Airflow on pristine dry material, dramatically lower airflow on exposure to humid air
**= Nominal manufacturer reported value, sample was too thick for gas liquid porometery

TABLE 3

| Article | Construction | SAP | Test | # Pressure Pulses | Amount of Water Passing Sample (ml) | Amount of fuel passing sample after switch to wafer feed (ml) | Initial dP (psi) | dP on restart after draining water (psi) | Challenge Fuel |
|---|---|---|---|---|---|---|---|---|---|
| Example 18 | Inventive/Pleated | No | Initial | 8 | <1 | 450 | 0.89 | 1.85 | Jet A + 2 wt % DIEGME |
| | Inventive/Pleated | No | Reuse | 6 | 2 | 320 | 1.85 | na | Jet A + 2 wt % DIEGME |
| Comparative Example 14 | Commercial/Tubular | Yes | Initial | 7 | 14.5 | 675 | 9.08 | >90 | Jet A + 2 wt % DIEGME |

The invention claimed is:

1. A composite filter for use in a fuel stream comprising
(a) an ePTFE membrane;
(b) a support structure adjacent to said ePTFE membrane;
(c) said ePTFE membrane disposed upstream of said support structure in said fuel stream;
(d) and wherein the support structure fulfills the relation that the ratio of the ePTFE membrane matrix tensile strength to the support opening size or pore size is >100,000 psi/inch;
(e) and wherein said support structure has Mullen burst pressure >fuel wet water penetration pressure(FWWPP) of the ePTFE membrane;
(f) and wherein the membrane of said composite exhibits a Ratio of Resistances for Water Penetration to flow [(FWWPP/IFT)/(1/ATEQ Airflow)]>104,000 [(PSI/(lb/ft))/(hr/L)].

2. The composite fuel filter of claim 1 wherein Ratio of Resistances for Water Penetration to flow [(FWWPP/IFT)/(1/ATEQ Airflow)]>200,000 [(PSI(lb/ft))/(hr/L)].

3. The composite fuel filter of claim 1 wherein Ratio of Resistances for Water Penetration to flow [(FWWPP/IFT)/(1/ATEQ Airflow)]>300,000 [(PSI(lb/ft))/(hr/L)].

4. The composite of claim 1 wherein the normalized fuel wet resistance to water entry (FWWPP/IFT) is >2600 (PSI/(lb/ft)).

5. The composite of claim 1 wherein the normalized fuel wet resistance to water entry (FWWPP/IFT) is >6000 (PSI/(lb/ft)).

6. The composite of claim 1 wherein the normalized fuel wet resistance to water entry (FWWPP/IFT) is >10,000 (PSI/(lb/ft)).

7. The composite fuel filter of claim 1 wherein the ePTFE membrane has a bubble point (BP)>45 PSI.

8. The composite fuel filter of claim 1 wherein the support structure comprises a woven.

9. The composite fuel filter of claim 1 wherein the support structure comprises a nonwoven.

10. The composite fuel filter of claim 1 wherein the support structure comprises a porous membrane.

11. The composite fuel filter of claim 1 wherein the support structure comprises PTFE.

12. A filter housing comprising the composite fuel filter of claim 1 in the form of a flat sheet.

13. A filter housing comprising the composite fuel filter of claim 1 in the form of pleated media.

14. The composite fuel filter of claim 1 for use in an aerospace application.

15. The composite fuel filter of claim 1 for use in an industrial mining application.

16. The composite fuel filter of claim 1 for use in an automotive or trucking application.

17. A composite filter for use in a fuel stream comprising
   (a) an ePTFE membrane;
   (b) a support structure adjacent to said ePTFE membrane;
   (c) said ePTFE membrane disposed upstream of said support structure in said fuel stream;
   (d) and wherein the support structure fulfills the relation that the ratio of the ePTFE membrane matrix tensile strength to the support opening size or pore size is >1000000 psi/inch;
   (e) and wherein said support structure has Mullen burst pressure>fuel wet water penetration pressure(FWWPP) of the ePTFE membrane;
   (f) and wherein the membrane of said composite exhibits a Ratio of Resistances for Water Penetration to flow [(FWWPP/IFT)/(1/ATEQ Airflow)]>104,000 [(PSI/(lb/ft))/(hr/L)];
   (g) and wherein the normalized fuel wet resistance to water entry (FWWPP/IFT) is >6000 (PSI/(lb/ft));
   (h) and wherein the ePTFE Membrane has a bubble point BP>50 PSI.

18. The composite filter of claim 17, wherein the fuel stream comprises an icing inhibitor.

19. The composite filter of claim 1, wherein the fuel stream comprises an icing inhibitor.

* * * * *